United States Patent
Feria

(10) Patent No.: US 7,773,032 B2
(45) Date of Patent: Aug. 10, 2010

(54) METHODS AND APPLICATIONS UTILIZING SIGNAL SOURCE MEMORY SPACE COMPRESSION AND SIGNAL PROCESSOR COMPUTATIONAL TIME COMPRESSION

(75) Inventor: Erlan H. Feria, Princeton, NJ (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 12/299,851

(22) PCT Filed: May 10, 2007

(86) PCT No.: PCT/US2007/068694

§ 371 (c)(1),
(2), (4) Date: Feb. 26, 2009

(87) PCT Pub. No.: WO2008/066949

PCT Pub. Date: Jun. 5, 2008

(65) Prior Publication Data

US 2009/0322612 A1    Dec. 31, 2009

Related U.S. Application Data

(60) Provisional application No. 60/799,696, filed on May 10, 2006.

(51) Int. Cl.
*G01S 13/00* (2006.01)
(52) U.S. Cl. .................. 342/195; 342/159; 342/161; 342/373
(58) Field of Classification Search ......... 342/159–162, 342/195, 373
See application file for complete search history.

(56) References Cited

U.S. PATENT DOCUMENTS

| 3,727,220 | A | * | 4/1973 | Brennan et al. | 342/89 |
|---|---|---|---|---|---|
| 5,341,142 | A | * | 8/1994 | Reis et al. | 342/64 |
| 5,602,760 | A | | 2/1997 | Chacon et al. | |
| 5,617,099 | A | * | 4/1997 | Warren et al. | 342/159 |
| 5,760,734 | A | * | 6/1998 | Urkowitz | 342/159 |
| 6,600,446 | B2 | * | 7/2003 | Moch | 342/373 |
| 7,145,971 | B2 | * | 12/2006 | Raleigh et al. | 375/347 |
| 7,415,065 | B2 | * | 8/2008 | Sud et al. | 375/230 |
| 2002/0152253 | A1 | | 10/2002 | Ricks et al. | |
| 2007/0080855 | A1 | * | 4/2007 | Gerlach et al. | 342/195 |
| 2009/0322612 | A1 | * | 12/2009 | Feria | 342/373 |
| 2010/0019957 | A1 | * | 1/2010 | Feria | 342/25 F |

FOREIGN PATENT DOCUMENTS

DE    3639500 A1 *  6/1988
WO    WO-2004077093    9/2004

* cited by examiner

*Primary Examiner*—John B Sotomayor
(74) *Attorney, Agent, or Firm*—Fish & Richardson P.C.

(57) ABSTRACT

A method and apparatus for a simplified approach for determining the output of a total covariance signal processor. A single set of offline calculations is performed and then used to estimate the output of the total covariance signal processor. A simplified approach for performing matrix inversion may also be used in determining the output of the total covariance processor.

11 Claims, 30 Drawing Sheets

X=UCMD and Y=CCPC

METHODS AND APPLICATIONS UTILIZING SIGNAL SOURCE MEMORY SPACE COMPRESSION AND SIGNAL PROCESSOR COMPUTATIONAL TIME COMPRESSION

CROSS REFERENCE TO RELATED APPLICATIONS

The present application is a U.S. national phase of PCT/US2007/068694 filed May 10, 2007, which claims the benefit of U.S. Provisional Patent Application No. 60/799,696, filed May 10, 2006, both of which are hereby incorporated by reference in their entireties.

This patent application claims the benefit of priority of U.S. Provisional Patent Application Ser. No. 60/799,696, filed May 10, 2006, entitled METHODS AND APPLICATIONS UTILIZING SIGNAL SOURCE MEMORY SPACE COMPRESSION AND SIGNAL PROCESSOR COMPUTATIONAL TIME COMPRESSION, the entire disclosure of which is incorporated herein by reference.

STATEMENT AS TO RIGHTS TO INVENTIONS MADE UNDER FEDERALLY SPONSORED RESEARCH OR DEVELOPMENT

This application was supported in part by the Defense Advanced Research Projects Agency (DARPA) under the KASSPER Program Grant No. FA8750-04-1-004DARPA. The government of the United States may have certain rights in this application.

FIELD OF INVENTION

The present invention relates to signal processing, and in particular to efficient signal processing techniques which apply time compression solutions that increase signal processor throughput.

BACKGROUND OF THE INVENTION

In the systems arena two design problems prominently reign. One has as its fundamental goal the efficient storage of signals that are produced by a signal source of either artificial or biological origin, e.g., voice, music, video and computer data sources. The other relates to the efficient processing of these signals that may for instance result in their Fourier transform, covariance, etc. The design of efficient signal storage algorithms relies heavily on source coding. The area of source coding has a conspicuous recent history and has been one of the enabling technologies for what is known today as the information revolution. The reason why this is the case is because source coding provides a sound practical and theoretical measure for the information associated with any signal source output event and its average value or entropy. This information can then be used to provide an efficient replacement or source coder for the signal source that can be either lossless or lossy depending if its output matches that of the signal source. Examples of lossless source coders are Huffman, Entropy, and Arithmetic coders as described in *The Communications Handbook*, J. D. Gibson, ed., IEEE Press, 1997. For the lossy case the standards of JPEG, MPEG and wavelets based JPEG2000, predictive-transform (PT) source-coding, etc., have been advanced. See *Predictive-Transform Source Coding with Bit Planes*, Feria and Licul, Submitted to 2006 IEEE Conference on Systems, Man and Cybernetics, October 2006.

The design of efficient signal processing techniques is approached with a myriad of techniques that, unfortunately, are not similarly guided by a theoretical framework that encompasses both lossless and lossy solutions.

A real-world problem whose high performance is attributed to its use of an intelligent system (IS) is knowledge-aided (KA) airborne moving target indicator (AMTI) radar such as found in DARPA's knowledge aided sensory signal processing expert reasoning (KASSPER). The IS includes two subsystems in cascade. The first subsystem is a memory device containing the intelligence or prior knowledge. The intelligence is clutter whose knowledge facilitates the detection of a moving target. The clutter is available in the form of synthetic aperture radar (SAR) imagery where each SAR image requires 4 MB of memory space. Since the required memory space for SAR imagery is prohibitive, it then becomes necessary to use 'lossy' memory space compression source coding schemes to address this problem of memory space.

The second subsystem of the IS architecture is the intelligence processor (IP) which is a clutter covariance processor (CCP). The CCP is characterized by the on-line computation of a large number of complex matrices where a typical dimension for these matrices is 256×256 which results when both the number of antenna elements and transmitted antenna pulses during a coherent pulse interval (CPI) is 16. Clearly these computations significantly slow down the on-line derivation of the pre-requisite clutter covariances.

The present invention addresses these CCP computational issues using a novel time compression processor coding methodology that inherently arises as the 'time compression dual' of space compression source coding. Further, missing from the art is a lossy signal processor that utilizes efficient signal processing techniques to achieve high speed results having a high confidence level of accuracy. The present invention can satisfy one or more of these and other needs.

In another aspect, the present invention relates to a simplified approach for determining the output of a total covariance signal processor. Such an approach may be used, for example, in connection with an antenna-based radar system to make a decision as to whether or not a target may be present at a particular location. Instead of estimating the output of a clutter covariance processor by performing certain calculations offline, characterizing the input signal using online calculations, and then using the online calculations to select one of the offline calculations, as discussed in the embodiments above dealing with clutter covariance processors, in this embodiment, a single offline set of calculations is performed and then used to estimate of the output of the total covariance processor in conjunction with the antenna signal obtained at the time of viewing a target.

In yet another embodiment of the present invention, a simplified algorithm for performing matrix inversion is used, for example, in conjunction with the previously described embodiment where the output of the total covariance processor is estimated using an inverse matrix, such as the inverse matrix $R^{-1}$ discussed above. The simplified matrix inversion algorithm utilizes a sidelobe canceller approach for matrix inversion, in conjunction with the predictive transform estimation approaches discussed herein. The sidelobe canceller essentially removes and/or minimizes the effect of the antenna sidelobe signals on the antenna main beam return signal.

BRIEF DESCRIPTION OF THE DRAWING FIGURES

DETAILED DESCRIPTION OF THE ILLUSTRATIVE EMBODIMENTS

Figure 1:
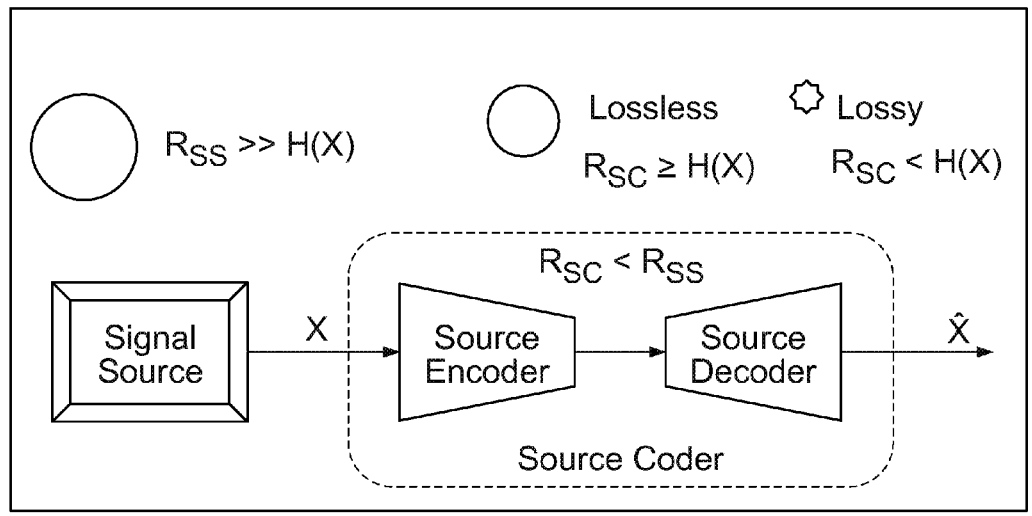
FIG. 1 depicts a conventional source coding system.

In FIG. 1 a source coding system is shown where the output of the signal source is a discrete random variable X whose possible realizations belong to a finite alphabet of L elements, i.e., $X \in \{a_1, \ldots, a_L\}$. Furthermore, the amount of "information" associated with the appearance of the element $a_i$ on the output of the signal source is denoted as $I(a_i)$ and is defined in terms of the probability of $a_i$, $p(a_i)$, as follows:

$$I(a_i) = \log_2 \frac{1}{p(a_i)} \tag{1.1}$$

in units of bits (binary digits). Clearly from this expression it is noted that a high probability event conveys a small amount of information while one that rarely occurs conveys a lot of information. The source entropy is then defined as the average amount of information in bits/sample H(X) that is associated with the random variable X. Thus $$H(X) = \sum_{i=1}^{L} p(a_i) \log_2 \frac{1}{p(a_i)} \tag{1.2}$$

The signal source rate (in bits/sample) is defined by $R_{ss}$ and is usually significantly greater than the source entropy H(X) as indicated in FIG. 1. In the same figure, a source coder is presented which is made up of an encoder followed by a decoder section. The input of the source coder is the output of the signal source, while its output is an estimate $\hat{X}$ of its input X. The source coder rate is defined as $R_{sc}$ and is generally smaller than the signal source rate $R_{ss}$. The source coder will be lossless ($\hat{X}=X$) when $R_{sc}$ is greater than or equal to the source entropy H(X) and lossy when $R_{sc}$ is smaller that the source entropy as shown in FIG. 1.

A novel practical and theoretical framework, namely, processor coding, which arises as the time dual of source coding is part of the present invention. Processor coding directly addresses the problem of designing efficient signal processors. The aforementioned duality is apparent when it is noted that the key concern of source coding is memory "space compression" while that of the novel processor coding methodology is computational "time compression." Thus, both source coding and processor coding solutions are noted to be characterized by compression designs, and thus, the combination of both coding design approaches is given the name compression-designs ("Conde").

In viewing processor coding as the time dual of source coding, it is first realized that the time duals of bits, information, entropy, and a source coder in source coding are bors, latency, ectropy and a processor coder in processor coding, respectively. These terms may be described as follows:

1) "Bor" is short for a specified binary operator time delay;

2) "Latency" is the minimum time delay from the input to a specified scalar output of the signal processor that can be derived from redesigning the internal structure of the signal processor subjected to implementation components and architectural constraints;

3) "Ectropy", with Greek roots 'ec' meaning outside and 'tropy' to look, is the maximum latency associated with all the scalar outputs of the signal processor; and 4) "Processor coder" is the efficient signal processor that is derived using the processor coding methodology. A processor coder like a source coder can be either lossless or lossy depending whether its output matches the original signal processor output.

Figure 2:
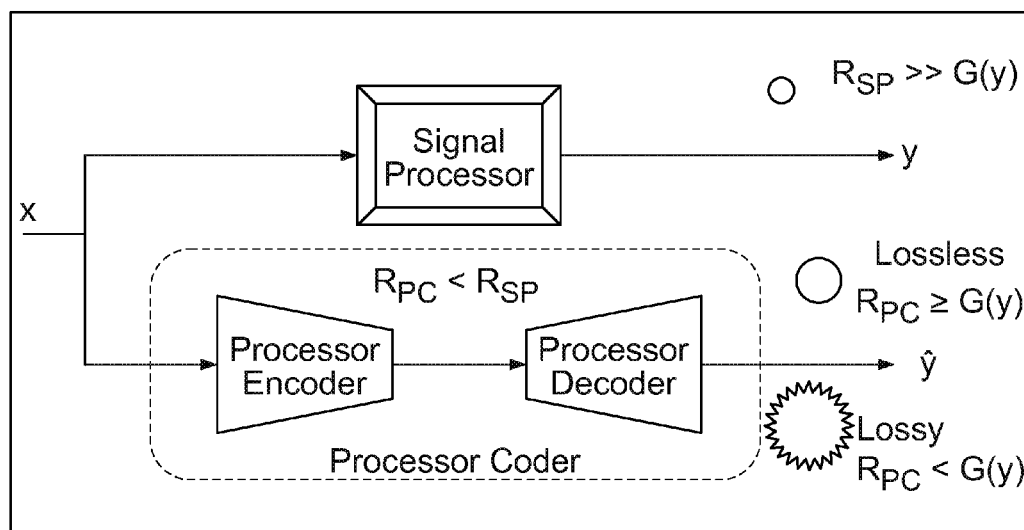
FIG. 2 depicts a processor coding system in accordance with an embodiment of the invention.

In FIG. 2 a processor coding system is depicted where the output of the signal processor is an M dimensional vector $y=[y_1, \ldots, y_M]$ and its input is the N dimensional vector $x=[x_1, \ldots, x_N]$. Furthermore, the amount of "latency" associated with the appearance of the element $y_i$ on the output of the signal processor is denoted as $L(y_i)$ and as mentioned earlier is the minimum time delay in time units of bors from the input x to scalar output $y_i$ of the signal processor. The latency can then be derived from redesigning the internal structure of the signal processor subjected to implementation components and architectural constraints. Clearly this definition implies the more severe the implementation components and architectural constraints are the larger the latency. These constraints are the time dual of probability in source coding when determining the amount of information. The ectropy of the signal processor G(y) or processor ectropy is then the maximum latency among all the M latency terms associate with the M elements of the signal processor output y, i.e., $$G(y) = \max_{L(y_i)}[L(y_1), \ldots, L(y_M)] \quad (1.3)$$

The signal processor rate (in bors/y) is $R_{SP}$ and is normally significantly greater than the processor ectropy G(y) as indicated in FIG. 2. In the same figure a processor coder is presented that is made up of an encoder followed by a decoder section. The input of the processor coder x is the same as the input of the signal processor while its output is an estimate $\hat{y}$ of the signal processor output y. The processor coder rate is $R_{PC}$ and is smaller than the signal processor rate $R_{SP}$. The processor coder will be lossless ($\hat{y}=y$) when $R_{PC}$ is greater than or equal to the processor ectropy and lossy when its $R_{PC}$ is smaller than the processor ectropy as shown in FIG. 2.

The compression-designs or Conde methodology according to the present invention have been applied to a simulation of a real-world intelligent system problem with remarkable success. More specifically, the methodology has been applied to the design of a simulated efficient intelligent system for knowledge aided (KA) airborne moving target indicator (AMTI) radar that is subjected to severely taxing environmental disturbances. The studied intelligent system includes clutter in the form of SAR imagery used as the intelligence or prior knowledge and a clutter covariance processor (CCP) used as the intelligence processor.

Figure 3:
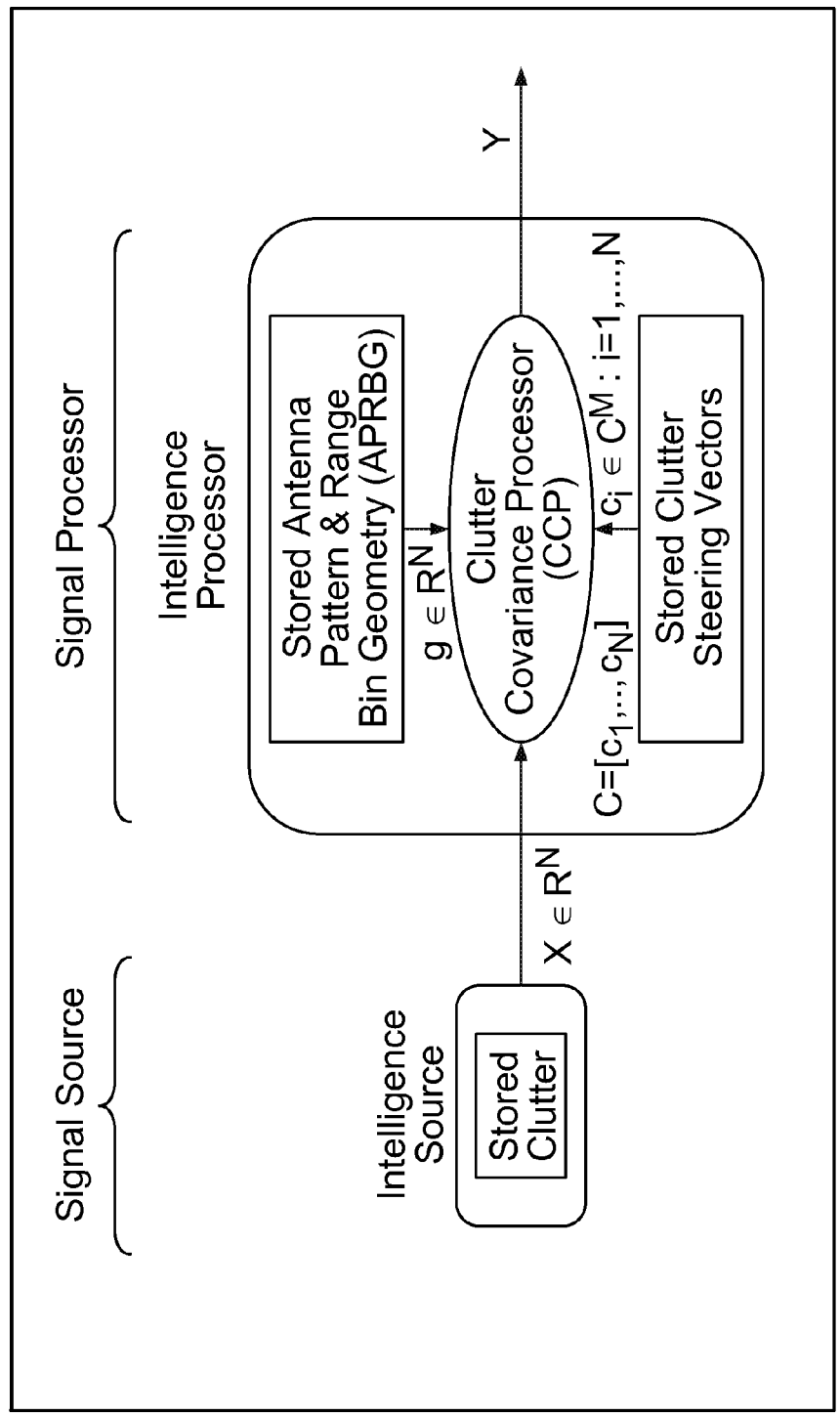
FIG. 3 depicts an embodiment of an intelligent system in accordance with the present invention.

In FIG. 3 the basic structure of the intelligent system is shown and includes a storage device for the clutter and the intelligence processor containing a clutter covariance processor receiving external inputs from the storage device as well as internal inputs. The internal inputs of the CCP are the antenna pattern and range bin geometry (APRBG) of the radar system and the complex clutter steering vectors. This intelligent system is responsible for the high signal to interference plus noise ratio (SINR) radar performance achieved with KA-AMTI but requires prohibitively expensive storage and computational requirements. These problems are addressed using the methodology of the present invention, Conde, with the following results:

1. For a "lossless" CCP coder to achieve outstanding SINR radar performance, the source coder that replaces the clutter source should be designed with knowledge of the radar system APRBG: In other words the source coder is radar seeing. This result yields a compression ratio of 8,192 for the tested 4 MB SAR imagery but has the drawback of requiring knowledge about the radar system before the compression of the SAR image is made.

2. For a significantly faster "lossy" CCP coder to derive exceptional SINR radar performance the source coder that replaces the clutter source can be designed without knowledge of the APRBG and is therefore said to be radar blind. This result yields the same compression ratio of 8,192 as the radar seeing case but is preferred since it is significantly simpler to implement and can be used with any type of radar system.

The above two results indicate that the combination of universal, i.e., radar blind, lossy source coders with an exceedingly fast lossy CCP coder is the key to the derivation of truly efficient intelligent systems for use in real-world radar systems and gives rise to the following observations:

1. It suggests a paradigm shift in the design of efficient signal processors where the emphasis before was placed on the derivation of lossless efficient signal processors, such as a lossless Fast Fourier Transform Processor, a lossless Fast Covariance Processor, etc., without any regard as to how the processor coder may be used in some particular application such as the target detection problem associated with radar systems.

2. The outstanding SINR detection performance derived with highly compressed prior knowledge, SAR imagery in the present invention, correlates quite well with how biological systems use highly compressed prior knowledge to make excellent decisions. Consider, for instance, how our brains expertly recognize a human face that had been viewed only once before and could not be redrawn with any accuracy, based only on this prior knowledge.

3. The duality that exists between space and time compression methodologies is pedagogically, theoretically, and practically appealing and their combined inner workings is extraordinary and worthy of notice.

4. It is of interest to note how the system performance remains high as both the space and time compressions are increased, suggesting an invariant-like property. As a fascinating and interesting practical example it should be noted that in physics there exists an observation frame of reference invariance that clearly constrains the evolution of space and time as it relates to the fact that the speed of light (in space over time units) is measured to be the same in any observation frame.

Figure 4:
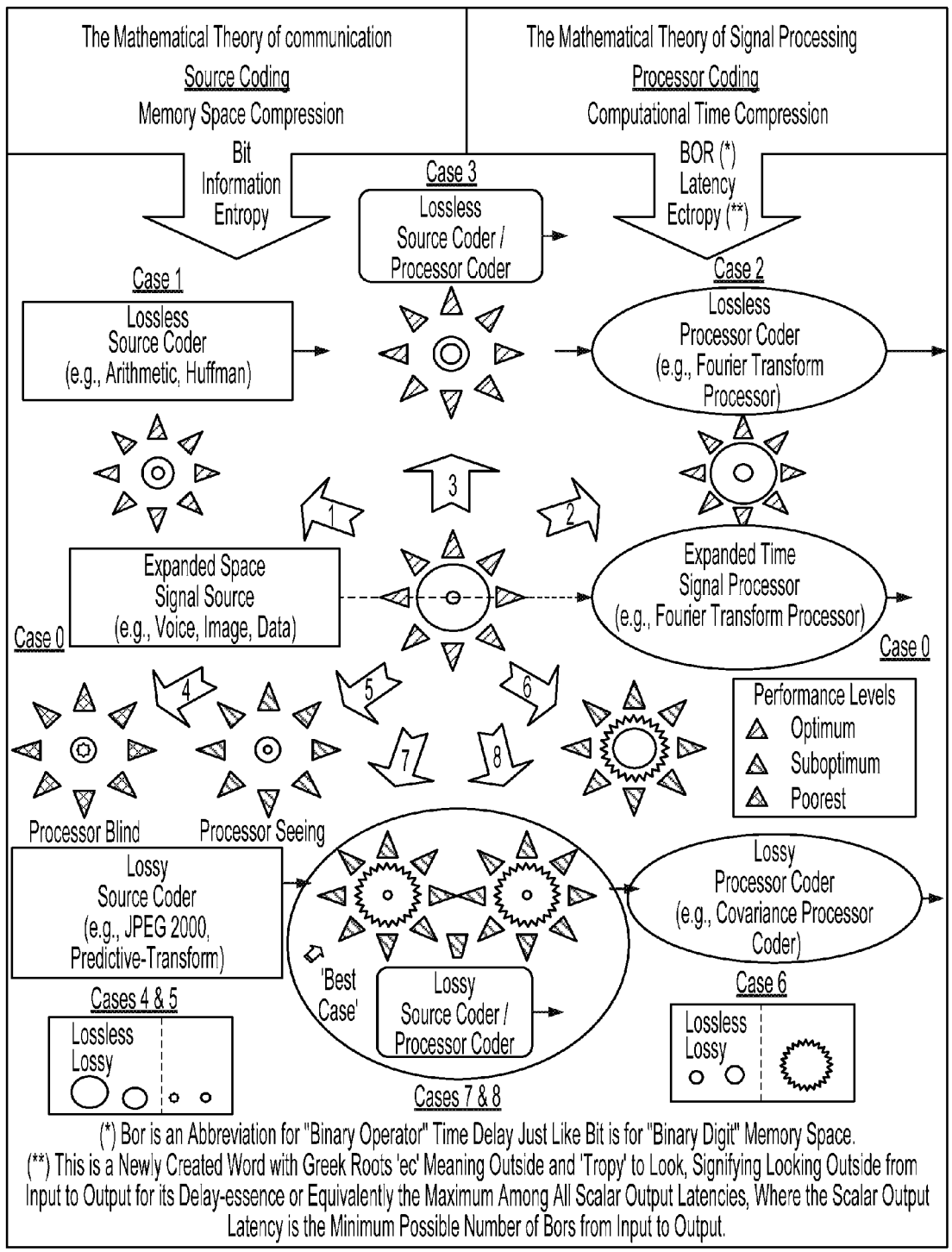
FIG. 4 depicts the duality of elements between the two complementary pillars of Compression-Designs.

FIG. 4 is a diagrammatic summary of the previously presented observations regarding certain characteristics of compression designs. First it is noted that FIG. 4 includes two columns. In the left column, space compression source coding is highlighted, while on the right column, time compression processor coding is illustrated. Nine different cases are displayed in this image. CASE 0, appearing in the middle of the figure, displays the signal source and signal processor for which one wishes to compress space and time, respectively. The picture in the middle between the signal source and the signal processor is composed of three major parts, which are described as follows:

1) The sun triangles, consisting of eight different triangles, each represent a different application where the signal source and signal processor may be used. The intensity of the shading inside these triangles denotes the application performance achieved in each case. Note that on the lower right hand side of the figure a chart is given setting forth the triangle appearance and corresponding application performance level. The darkest shading is used when an application achieves an optimum performance, whether or not the considered signal source and signal processor are compressed. Clearly the application's performance is optimum and therefore the shading is darkest for the lossless signal source and signal processor of CASE 0;

2) The large gray colored circle without a highlighted boundary represents the amount of memory space required to store the signal output of the signal source. On the left and bottom part of the image it is shown how the diameter of the gray colored circle decreases as the required memory space decreases. Two cases are displayed. One case corresponds to the lossless case and the other case corresponds to the lossy case. The lossy case in turn can be processor blind or processor seeing which displays an opening in the middle of the gray circle. Also, it should be noted that for the processor blind case the boundary of the gray circle is not smooth;

3) An unfilled black circle represents processor speed, where the reciprocal of its diameter reflects the time taken by the signal processor to produce an output. In other words the larger the diameter the faster the processor. On the right and bottom part of the image two cases of time compression are displayed. First, the lossless case that has smooth circles and then the lossy case that does not. CASE 1 displays a "lossless" source coder using the signal processor of CASE 0 where it is noted that the only difference between the illustrations for CASE 0 and CASE 1 is in the diameter of the space compression gray circle that is now smaller. CASE 2 is the opposite of CASE 1 where the diameter of the time compression unfilled black circle is now larger since the "lossless" processor coder is faster. CASE 3 combines CASES 1 and 2 resulting in an optimum solution in all respects, except it may still be taxing in terms of memory space and computational time requirements. CASES 4 thru 8 are "lossy" cases. CASES 4 and 5 pertain to either processor blind or processor seeing source coder cases where it is noted that the fundamental difference between the two is that the processor blind case yields a very poor application performance. On the other hand, the performance of the processor seeing case is suboptimum but very close to the optimum one. CASE 6 addresses the "lossy" processor coder case in the presence of a "lossless" source coder. For this case, everything seems to be satisfactory except that the required memory of the lossless source coder may still be too large. CASES 7 and 8 present what occurs when the two types of lossy source coders are used together with a 'lossy' processor coder. For these two cases it is found that the application performance is outstanding. CASE 7, in particular, is truly remarkable since it was found earlier for CASE 4 that a radar-blind source coder yields a very poor application performance when the processor coder is 'loss-less'. Thus it is concluded that CASE 7 is preferred over all other cases since while achieving an outstanding application performance it is characterized by excellent space and time compressions.

The time compression processor coding methodology gives rise to an exceedingly fast clutter covariance processor compressor (CCPC). The CCPC includes a look up memory containing a very small number of predicted clutter covariances (PCCs) that are suitably designed off-line (e.g., in advance) using a discrete number of clutter to noise ratios (CNRs) and shifted antenna patterns (SAPs), where the SAPs are mathematical computational artifices not physically implemented. The on-line selection of the best PCC is achieved by investigating for each case, e.g., each range bin, the actual CNR, as well as the clutter cell centroid (CCC), which conveys information about the best SAP to select. The CCPC embodying the present invention is both very fast and yields outstanding SINR radar performance using SAR imagery which is either radar-blind or radar-seeing and has been compressed by a factor of 8,192. The radar-blind SAR imagery compression results are truly remarkable in view of the fact that these simple and universal space compressor source coders cannot be used with a conventional CCP. The advanced CCPC is a 'lossy' processor coder that inherently arises from a novel practical and theoretical foundation for signal processing, namely, processor coding, that is the time compression signal processing dual of space compression source coding.

As described above, for processing coding the coding concepts include bor (or time delay needed for the execution of some specified binary operator), latency (or minimum time delay required to generate a scalar output for a signal processor after the internal structure of the signal processor has been redesigned subject to implementation components and architectural constraints), and ectropy (or maximum latency among all the latencies derived for the signal processor scalar outputs), respectively.

Figure 5:
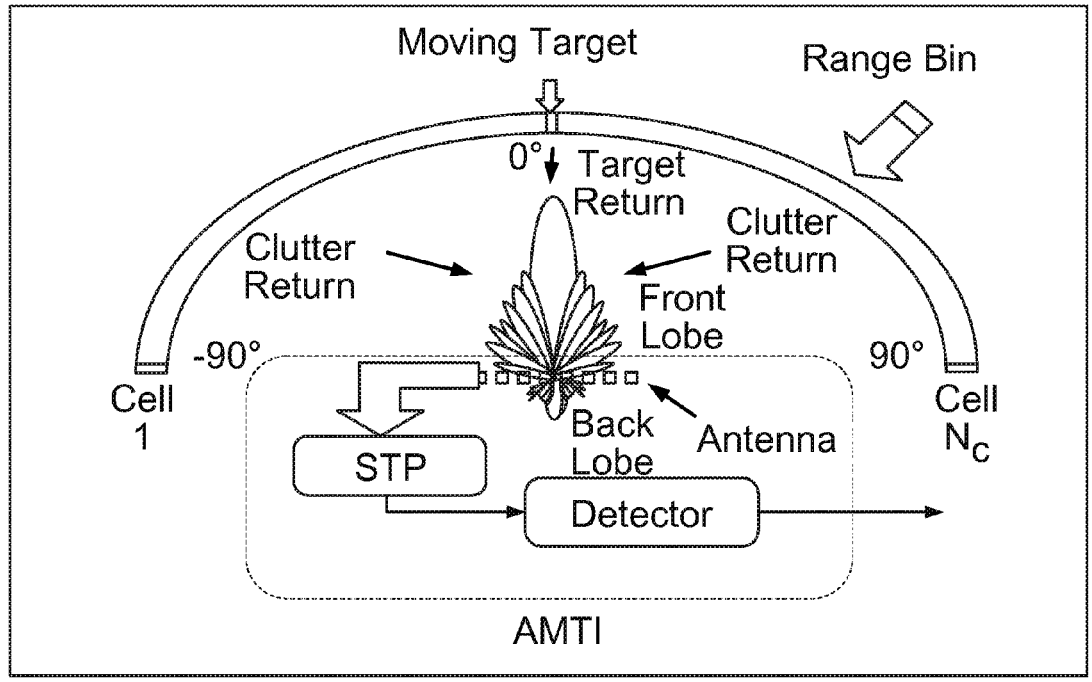
FIG. 5 illustrates a block diagram of a KA-AMTI radar system.

FIG. 5 depicts an overview of a KA-AMTI radar system. It includes two major structures. They are: 1) An iso-range ring, or range bin, for a uniform linear array (ULA) in uniform constant-velocity motion relative to the ground. Only the front of the iso-range ring is shown, corresponding to angle displacements from −90° to 90° relative to the antenna array boresight; and 2) An AMTI radar composed of an antenna, a space-time processor (STP) and a detection device. In KA-AMTI clutter returns are available in the form of SAR imagery that is obtained from a prior viewing of the area of interest. From this figure it is also noticed that the range bin is decomposed into NC clutter cells. NC is often greater than or equal to NM, where N is the number of antenna elements and M is the number of transmitted antenna pulses during a coherent pulse interval (CPI). In the example presented herein, M=16 and N=16. Table 1 is a summary of the relevant parameters, including those for M and N.

TABLE 1

| | | |
|---|---|---|
| a. | Antenna | $N = 16, M = 16, d/\lambda = \frac{1}{2}, f_r = 10^3$ Hz, $f_c = 10^9$ Hz, $K^f = 4 \times 10^5$ or 56 dBs, $K^b = 10^{-4}$ or −40 dBs, |
| b. | Clutter | $N_c = 256, \beta = 1, 41$ dBs $< 10\log_{10}CNR^f < 75$ dBs, $_b\sigma_{c,i}^2 = 1$ for all i, $10\log_{10}CNR^b = -40$ dBs, |
| c. | Target | $\theta_t = 0°$ |
| d. | Antenna Disturbance | $\sigma_n^2 = 1, \theta_{AAM} = 2°$ |
| e. | Jammers | $N_J = 3, \theta_{J_1} = -60°, \theta_{J_2} = -30°, \theta_{J_3} = 45°$, $10\log_{10}\sigma_{J,i}^2 = 34$ dBs for $i = 1, 2, 3$, $10\log_{10}JNR_1 = 53$ dBs, $10\log_{10}JNR_2 = -224$ dBs and $10\log_{10}JNR_3 = 66$ dBs |
| f. | Range Walk | $\rho = 0.999999$ |

TABLE 1-continued

| | | |
|---|---|---|
| g. | Internal Clutter Motion | b = 5.7, ω = 15 mph |
| h. | Narrowband CM | $\epsilon_i = 0$ for all i, $\gamma_i$ for all i fluctuates with a 5° rms |
| i. | Finite Bandwidth CM | $\Delta\epsilon = 0.001, \Delta\phi = 0.1°$ |
| j. | Angle Dependent CM | $B = 10^8$ Hz, $\Delta\theta = 28.6°$ |
| k. | Sample Matrix Inverse | Lsmi = 8 × 64 = 512, $\sigma_{diag}^2 = 10$ |

Figure 6:
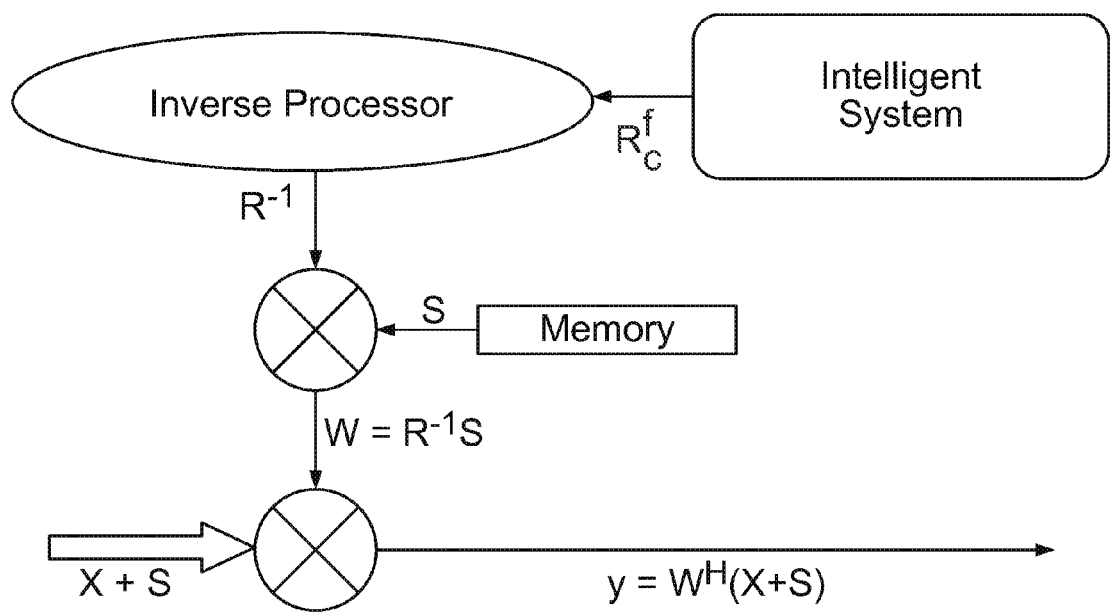
FIG. 6 illustrates an embodiment of a Space-Time Processor in accordance with the present invention.

FIG. 6 illustrates an embodiment of the STP architecture in accordance with the present invention. This input to the system is the addition of two signals, x and s. They are:

1) The NM×1 dimensional target steering vector s defined by $$s = [s_1(\theta_t)\ s_2(\theta_t)\ \ldots\ s_M(\theta_t)]^H \quad (2.1)$$

$$s_k(\theta_t) = e^{j2\pi(k-1)\bar{f}_D^t} s_I(\theta_t) \text{ for } k = 1, \ldots, M \quad (2.2)$$

$$s_I(\theta_t) = [s_{1,1}(\theta_t)\ s_{2,1}(\theta_t)\ \ldots\ s_{N,1}(\theta_t)] \quad (2.3)$$

$$s_{k,1}(\theta_t) = e^{j2\pi(k-1)\bar{\theta}_t} \text{ for } k = 1, \ldots, N \quad (2.4)$$

$$\bar{f}_D^t = f_D^t / f_r \quad (2.5)$$

$$f_D^t = 2v_t / \lambda \quad (2.6)$$

$$f_r = 1/T_r \quad (2.7)$$

$$\bar{\theta}_t = \frac{d}{\lambda}\sin(\theta_t) \quad (2.8)$$

where: a) $\theta_t$ is the angle of attack (AoA) of the target with respect to boresight; b) d is the antenna inter-element spacing; c) λ is the operating wavelength; d) $\bar{\theta}_t$ is the normalized $\theta_t$; e) $T_r$ is the pulse repetition interval (PRI); f) $f_r$ is the pulse repetition frequency (PRF); g) $v_t$ is the target radial velocity; h) $f_D^t$ is the Doppler of the target; and i) $\bar{f}_D^t$ is the normalized $f_D^t$.

2) The NM×1 dimensional vector x representing all system disturbances, which include the incident clutter, jammer, channel mismatch (CM), internal clutter motion (ICM), range walk (RW), antenna array misalignment (AAM), and thermal white noise (WN).

The NM×1 dimensional weight vector w, also shown in FIG. 6, multiplies the STP input (s+x) yielding the STP generally complex scalar output $y = w^H(s+x)$. The expression for w is in turn given by the direct inverse relation $$w = R^{-1}s \quad (2.9)$$

that results from the maximization of the signal to interference plus noise ratio (SINR)

$$SINR = w^H ss^H w / w^H R w \quad (2.10)$$

where the NM×NM dimensional matrix, R, is the total disturbance covariance defined by $R = E[xx^H]$. To model this covariance the covariance matrix tapers (CMTs) formulation was used resulting in $$R = \{R_C \text{ O } (R_{RW} + R_{ICM} + R_{CM})\} + \{R_J \text{ O } R_{CM}\} + R_n \quad (2.11)$$

$$R_C = R_c^f + R_c^b \quad (2.12)$$

where $R_n$, $R_c^f$, $R_c^b$, $R_C$, $R_J$, $R_{RW}$, $R_{ICM}$ and $R_{CM}$ are covariance matrices of dimension NM×NM and the symbol O denotes a Hadamard product or element by element multiplication. Moreover, these disturbance covariances correspond to: $R_n$ (thermal white noise); $R_c^f$ (front clutter); $R_c^b$ (back clutter); $R_C$ (total clutter); $R_J$ (jammer); $R_{RW}$ (range walk); $R_{ICM}$ (internal clutter motion); and $R_{CM}$ (channel mismatch). The covariances $R_{RW}$, $R_{ICM}$ and $R_{CM}$ are referred to as CMTs. The covariances $R_n$ and $R_c^f$ are repeatedly used herein, and they are described as follows:

Thermal white noise: $R_n$ is described as follows $$R_n = \sigma_n^2 I_{NM} \quad (2.13)$$

where $\sigma_n^2$ is the average power of thermal white noise and $I_{NM}$ is an identity matrix of dimension NM×NM. Notice from Table 1, in the examples presented herein, this noise power is assumed to be 1.

Figure 8:
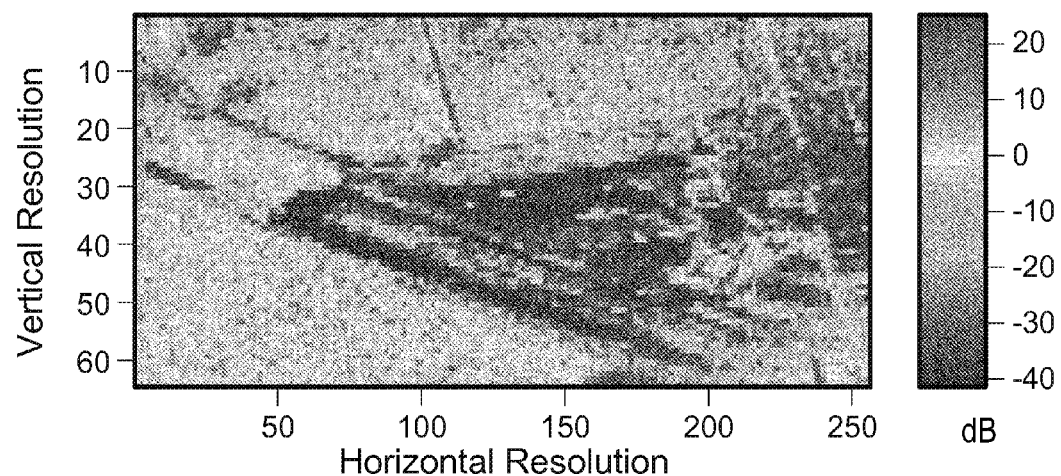
FIG. 8 is the image of FIG. 7 averaged to yield 64 range bins.
Figure 9:
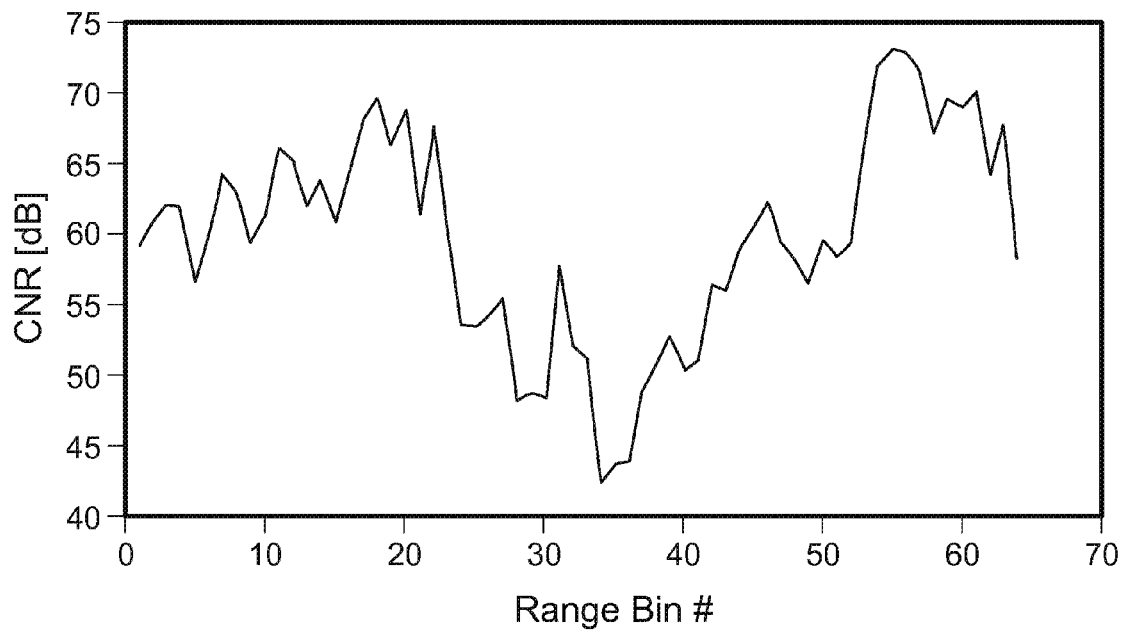
FIG. 9 is plot of front clutter to noise ratio.

Front Clutter Covariance: $R_c^f$ is the output of the intelligent system of FIG. 6 and is described as follows:

$$R_c^f = \sum_{i=1}^{N_c} p_c^f(\theta_c^i, \theta_t) c^f(\theta_c^i, \theta_{AAM}) c^f(\theta_c^i, \theta_{AAM})^H \quad (2.14)$$

$$p_c^f(\theta_c^i, \theta_t) = G_A^f(\theta_c^i, \theta_t) \,_f\sigma_{c,i}^2 \quad (2.15)$$

$$G_A^f(\theta_c^i, \theta_t) = K^f \left| \frac{\sin\{N\pi \frac{d}{\lambda}(\sin(\theta_c^i) - \sin(\theta_t))\}}{\sin\{\pi \frac{d}{\lambda}(\sin(\theta_c^i) - \sin(\theta_t))\}} \right|^2 \quad (2.16)$$

$$c^f(\theta_c^i, \theta_{AAM}) = \begin{bmatrix} f\underline{c}_1(\theta_c^i, \theta_{AAM}) \\ f\underline{c}_2(\theta_c^i, \theta_{AAM}) \ \ldots \ f\underline{c}_M(\theta_c^i, \theta_{AAM}) \end{bmatrix}^H \quad (2.17)$$

$$f\underline{c}_k(\theta_c^i, \theta_{AAM}) = e^{j2\pi(k-1)\bar{f}_D^{cf}(\theta_c^i, \theta_{AAM})} \underline{c}_1(\theta_c^i) \quad (2.18)$$
for $k = 1, \ldots, M$ $$\underline{c}_1(\theta_c^i) = [c_{1,1}(\theta_c^i)\ c_{2,1}(\theta_c^i)\ \ldots\ c_{N,1}(\theta_c^i)] \quad (2.19)$$

$$c_{k,1}(\theta_c^i) = e^{j2\pi(k-1)\bar{\theta}_c^i} \text{ for } k = 1, \ldots, N \quad (2.20)$$

$$\bar{f}_D^{cf}(\theta_c^i, \theta_{AAM}) = \beta\bar{\theta}_c^i \left\{ \sqrt{\frac{\cos(\theta_{AAM}) + \sin^2(\theta_{AAM}) + (\cos^2(\theta_{AMM}) - 1)\sin^2(\theta_c^i)}{\sin(\theta_c^i)}} \right\} \quad (2.21)$$

$$\beta = \frac{v_p T_r}{d/2} \quad (2.22)$$

$$\bar{\theta}_c^i = \frac{d}{\lambda}\sin(\theta_c^i) \quad (2.23)$$

where: a) the index i refers to the i-th front clutter cell on the range bin section shown on FIG. 5; b) $\sigma_c^i$ is the AoA of the i-th clutter cell; c) $\theta_{AAM}$ is the antenna array misalignment angle; d) $_f\sigma_{c,i}^2$ is the i-th front clutter source cell power (excluding the antenna gain); e) $G_A^f(\theta_c^i,\theta_t)$ is the antenna pattern gain associated with the i-th front clutter cell; f) $K^f$ is the front global antenna gain; g) $p_c^f(\theta_c^i,\theta_t)$ is the "total" i-th front clutter cell power. In the example presented herein, the 4 MB 1,024 by 254 samples SAR image of the Mojave Airport in California (FIG. 7) will be used with groups of sixteen consecutive rows averaged to yield the 64 range bins, as depicted in FIG. 8. In FIG. 9 a plot is also given of the front clutter to noise ratio (CNR$^f$), i.e., $$CNR^f = R_c^f(1,1)/\sigma_n^2 = \sum_{i=1}^{N_c} p_c^f(\theta_c^i, \theta_t)/\sigma_n^2, \quad (2.24)$$

for the 64 range bins with values ranging from 41 to 75 dBs where the average power of the thermal white noise was assumed equal to 1, i.e., $\sigma_n^2=1$; h) $c^f(\theta_c^i, \theta_{AAM})$ is the NM×1 dimensional and complex i-th clutter cell steering vector; i) $v_p$ is the radar platform speed; j) $\theta_c^{-i}$ is the normalized $\theta_c^i$; and k) $\beta$ is the ratio of the distance traversed by the radar platform during the PRI, $v_p T_r$, to the half antenna inter-element distance, d/2.

At this point it should be noted that expressions (2.14)-(2.15) define the clutter covariance processor or intelligence processor of the intelligent system of FIG. 3. In addition, the front clutter source cell power is the output of the intelligence source that the intelligence processor operates on.

Back Clutter

The back clutter covariance $R_c^b$ is given by $$R_c^b = \sum_{i=1}^{N_c} p_c^b(\theta_c^i, \theta_t) c^b(\theta_c^i, \theta_{AAM}) c^b(\theta_c^i, \theta_{AAM})^H \quad (2.25)$$

$$p_c^b(\theta_c^i, \theta_t) = G_A^b(\theta_c^i, \theta_t)_b\sigma_{c,i}^2 \quad (2.26)$$

$$G_A^b(\theta_c^i, \theta_t) = K^b \left| \frac{\sin\{N\pi\frac{d}{\lambda}(\sin(\theta_c^i)-\sin(\theta_t))\}}{\sin\{\pi\frac{d}{\lambda}(\sin(\theta_c^i)-\sin(\theta_t))\}} \right|^2 \quad (2.27)$$

$$c^b(\theta_c^i, \theta_{AAM}) = \begin{bmatrix} {}_b\underline{c}_1(\theta_c^i, \theta_{AAM}) \\ {}_b\underline{c}_2(\theta_c^i, \theta_{AAM}) \dots {}_b\underline{c}_M(\theta_c^i, \theta_{AAM}) \end{bmatrix}^H \quad (2.28)$$

$${}_b\underline{c}_k(\theta_c^i, \theta_{AAM}) = e^{j2\pi(k-1)\overline{f}_D^{cb}(\theta_c^i, \theta_{AAM})}\underline{c}_1(\theta_c^i) \quad (2.29)$$
for $k = 1, \dots, M$ $$\overline{f}_D^{cb}(\theta_c^i, \theta_{AAM}) = \beta\overline{\theta}_c^i \left\{ \begin{array}{c} \cos(\theta_{AAM}) - \\ \sqrt{\frac{\sin^2(\theta_{AAM})+}{(\cos^2(\theta_{AMM})-1)\sin^2(\theta_c^i)}} \\ \sin(\theta_c^i) \end{array} \right\} \quad (2.30)$$

where: a) the index i now refers to the i-th clutter cell on the back side of the iso-range ring, not shown in FIG. 5; b) $\theta_c^i$ is the AoA of the i-th back clutter cell; c) ${}_b\sigma_{c,i}^2$ is the i-th back clutter source cell power (assumed one for all i; see Table 1, entry b); d) $G_A^b(\theta_c^i,\theta_t)$ is the back antenna pattern gain associated with ${}_b\sigma_{c,i}^2$; e) $K^b$ is the global back antenna gain (assumed $10^{-4}$, see Table 1, entry a); f) $p_c^b(\theta_c^i,\theta_t)$ is the total clutter cell power of the i-th back clutter cell (the back clutter to noise ratio, $CNR^b$, is described as:

$$CNR^b = R_c^b(1,1)/\sigma_n^2 = \sum_{i=1}^{N_c} p_c^f(\theta_c^i, \theta_t)/\sigma_n^2, \quad (2.31)$$

and is assumed to be −40 dB, see Table 1, entry b); f) $c^b(\theta_c^i, \theta_{AAM})$ is the NM×1 dimensional and complex steering vector associated with ${}_b\sigma_{c,i}^2$; and g) $\underline{c}_1(\theta_c^i)$ is as defined in (2.19)-(2.20).

Jammer

The jammer covariance $R_J$ is given by $$R_J = \sum_{i=1}^{N_J} p_J(\theta_J^i, \theta_t)(I_M \otimes 1_{N\times N})O(j(\theta_J^i) \cdot j(\theta_J^i)^H) \quad (2.32)$$

$$p_J(\theta_J^i, \theta_t) = G_A^f(\theta_J^i, \theta_t)\sigma_{J,i}^2 \quad (2.33)$$

$$j(\theta_J^i) = [j_1(\theta_J^i) \; j_2(\theta_J^i) \; \dots \; j_M(\theta_J^i)]^H \quad (2.34)$$

$$j_k(\theta_J^i) = j_1(\theta_J^i) \text{ for } k = 1, \dots, M \quad (2.35)$$

$$j_1(\theta_J^i) = [j_{1,1}(\theta_J^i) \; j_{2,1}(\theta_J^i) \; \dots \; j_{N,1}(\theta_J^i)]^H \quad (2.36)$$

$$j_{k,1}(\theta_J^i) = e^{j2\pi(k-1)\overline{\theta}_J^i} \text{ for } k = 1, \dots, N \quad (2.37)$$

$$\overline{\theta}_J^i = \frac{d}{\lambda}\sin(\theta_J^i) \quad (2.38)$$

where: a) the index i refers to the i-th jammer on the range bin; b) $N_J$ is the total number of jammers (assumed to be three; see Table 1, entry e); c) $\theta_J^i$ is the AoA of the i-th jammer (the location of the three assumed jammers are at −60°, −30°, and 45°; see Table 1, entry e); d) ⊗ is the Kronecker (or tensor) product; e) $I_M$ is an identity matrix of dimension M by M; f) $1_{N\times N}$ is a unity matrix of dimension N by N; g) $\sigma_{J_i}^2$ is the i-th jammer power (34 dB is assumed for the three jammers considered; see Table 1, entry e); h) $p_J(\theta_c^i,\theta^r)$ is the "total" i-th jammer power, the jammer to noise ratio (JNR), is described as follows:

$$JNR = R_J(1,1)/\sigma_n^2 = \sum_{i=1}^{N_J} p_J(\theta_c^i, \theta_t)/\sigma_n^2, \quad (2.39)$$

is given by 53, −224, and 66 dB for the jammers at −60°, −30°, and 45°, respectively; see Table 1, entry e); and i) $j(\theta_J^i)$ is the NM×1 dimensional and complex i-th jammer steering vector that is noted from the defining equations (2.34)-(2.38) to be Doppler independent.

Range Walk

The range walk or RW CMT, $R_{RW}$, is described as follows:

$$R_{RW} = R_{RW}^{time} \otimes R_{RW}^{space} \quad (2.40)$$

$$[R_{RW}^{time}]_{i,k} = \rho^{|i-k|} \quad (2.41)$$

$$R_{RW}^{space} = 1_{N\times N} \quad (2.42)$$

$$\rho = \Delta A/A = \Delta A/\{\Delta R\Delta\theta\} = \Delta A/\{(c/B)\Delta\theta\} \quad (2.43)$$

where: a) c is the velocity of light; b) B is the bandwidth of the compressed pulse; c) $\Delta R$ is the range-bin radial width; d) $\Delta\theta$ is the mainbeam width; e) A is the area of coverage on the range bin associated with $\Delta\theta$ at the beginning of the range walk; f) $\Delta A$ is the remnants of area A after the range bin migrates during a CPI; and g) $\rho$ is the fractional part of A that remains after the range walk (for example, $\rho$=0.999999; see Table 1, entry f).

Internal Clutter Motion

The internal clutter motion or ICM CMT, $R_{ICM}$, is described as follows:

$$R_{ICM} = R_{ICM}^{time} \otimes R_{ICM}^{space} \tag{2.44}$$

$$[R_{ICM}^{time}]_{i,k} = \frac{r}{r+1} + \frac{1}{r+1} \frac{(bc)^2}{(bc)^2 + (4\pi f_c |k-i| T_r)^2} \tag{2.45}$$

$$R_{ICM}^{space} = 1_{N \times N} \tag{2.46}$$

$$10\log_{10} r = -15.5\log_{10}\omega - 12.1\log_{10} f_c + 63.2 \tag{2.47}$$

where: a) $f_c$ is the carrier frequency in megahertz; b) $\omega$ is the wind speed in miles per hour; c) r is the ratio between the dc and ac terms of the clutter Doppler power spectral density; d) b is a shape factor that has been tabulated; and e) c is the speed of light. In the example presented herein, $f_c$=1,000 MHz, $\omega$=15 mph and b=5.7; see Table 1, entries a, g.

Channel Mismatch

The total channel mismatch or CM CMT, $R_{CM}$, is described as follows:

$$R_{CM} = R_{NB} \circ R_{FB} \circ R_{AD} \tag{2.48}$$

where $R_{NB}$, $R_{FB}$ and $R_{AD}$ are composite CMTs, as described below.

Angle Independent Narrowband $R_{NB}$ is an angle-independent narrowband or NB channel mismatch CMT, which is described as follows:

$$R_{NB} = qq^H \tag{2.49}$$

$$q = [q_1 \ q_2 \ \cdots \ q_M]^H \tag{2.50}$$

$$q_k = q_1 \text{ for } k = 1, \ldots, M \tag{2.51}$$

$$q_1 = [\varepsilon_1 e^{j\gamma_1} \varepsilon_2 e^{j\gamma_2} \ \ldots \ \varepsilon_N e^{j\gamma_N}] \tag{2.52}$$

where in (2.52) $\Delta\varepsilon_1, \ldots, \Delta\varepsilon_N$ and $\Delta\gamma_1, \ldots, \Delta\gamma_N$ denote amplitude and phase errors, respectively. In the example presented herein, the amplitude errors are assumed to be zero and the phase errors are assumed to fluctuate with a 5° root mean square (rms); see Table 1, entry h.

Finite Bandwidth $R_{FB}$ is a finite (nonzero) bandwidth or FB channel mismatch CMT, which is described as follows:

$$R_{FB} = R_{FB}^{time} \otimes R_{FB}^{space} \tag{2.53}$$

$$R_{FB}^{time} = 1_{M \times M} \tag{2.54}$$

$$[R_{FB}^{space}]_{i,k} = (1 - \Delta\varepsilon/2)^2 \text{sinc}^2(\Delta\phi/2) \text{ for } i \neq k \tag{2.55}$$

$$[R_{FB}^{space}]_{i,i} = 1 - \Delta\varepsilon + \frac{1}{3}\Delta\varepsilon^2 \text{ for } i = 1, \ldots, N \tag{2.56}$$

where in (2.55)-(2.56) $\Delta\varepsilon$ and $\Delta\phi$ denote the peak deviations of decorrelating random amplitude and phase channel mismatch, respectively. In the example presented herein, $\Delta\varepsilon$=0.001 and $\Delta\phi$=0.1°; see Table 1, entry i.

Angle Dependent $R_{AD}$ is a reasonably approximate angle-independent CMT for angle-dependent or AD channel mismatch, which is described as follows:

$$R_{AD} = R_{AD}^{time} \otimes R_{AD}^{space} \tag{2.57}$$

$$R_{AD}^{time} = 1_{M \times M} \tag{2.58}$$

$$[R_{AD}^{space}]_{i,k} = \text{sinc}\left(B|k-i|\frac{d}{c}\sin(\Delta\theta)\right) \text{ for } i \neq k \tag{2.59}$$

$$[R_{AD}^{space}]_{i,i} = 1 \tag{2.60}$$

where B is the bandwidth of an ideal bandpass filter and $\Delta\theta$ is a suitable measure of mainbeam width. In the example presented herein, B=100 MHz and $\Delta\theta$=28.6°; see Table 1, entry j.

Optimum Direct Inverse

The w that maximizes the SINR expression (2.10) is given by the following expression:

$$w = R^{-1}s. \tag{2.61}$$

Two general approaches can be used to derive R. They are:
1) The first approach is not knowledge-aided and is given by the SMI expression:

$$^{smi}R = \frac{1}{Lsmi}\sum_{i=1}^{Lsmi} X_i X_i^H + \sigma_{diag}^2 I \tag{2.62}$$

where $X_i$ denotes radar measurements from range bins close to the range bin under investigation, Lsmi is the number of measurement samples and $\sigma_{diag}^2 I$ is a diagonal loading term. $X_i$ may be derived via the following generating expression $$X_i = R_i^{-1/2} x_i \tag{2.63}$$

where: a) $x_i$ is a zero mean, unity variance, NM dimensional complex random draw; and b) $R_i$ is the total disturbance covariance (2.11)-(2.12) associated with the i-th range bin. In the example presented herein $\sigma_{diag}^2 = 10\sigma_n^2 = 10$; see Table 1, entry k.

2) The second approach is KA and assumes knowledge of all the covariances associated with the total disturbance covariance R, see (2.11)-(2.12).

Radar Blind and Radar Seeing Source-Coders

FIG. 3 presents the intelligence source and intelligence processor subsystems of the intelligent system of FIG. 6. The intelligence source contains the stored SAR imagery or clutter, while the intelligence-processor or CCP uses as its external input the output of the SAR imagery source, and as internal inputs the antenna pattern and range bin geometry or APRBG and the front clutter steering vectors (2.18) to compute the front clutter covariance matrix (2.15). Although this system results in optimum SINR radar performance, it is highly inefficient in terms of both its memory storage and on-line computing hardware requirements. To alleviate the memory storage problem associated with the intelligent system two different types of source coders may be investigated as tentative replacements for the intelligence-source of FIG. 3. These include a simple predictive-transform (PT) radar-blind scheme that is oblivious to the APRBG and a more elaborate radar-seeing scheme that makes use of the APRBG. These two schemes are now reviewed in the form of block diagram descriptions.

Figure 10:
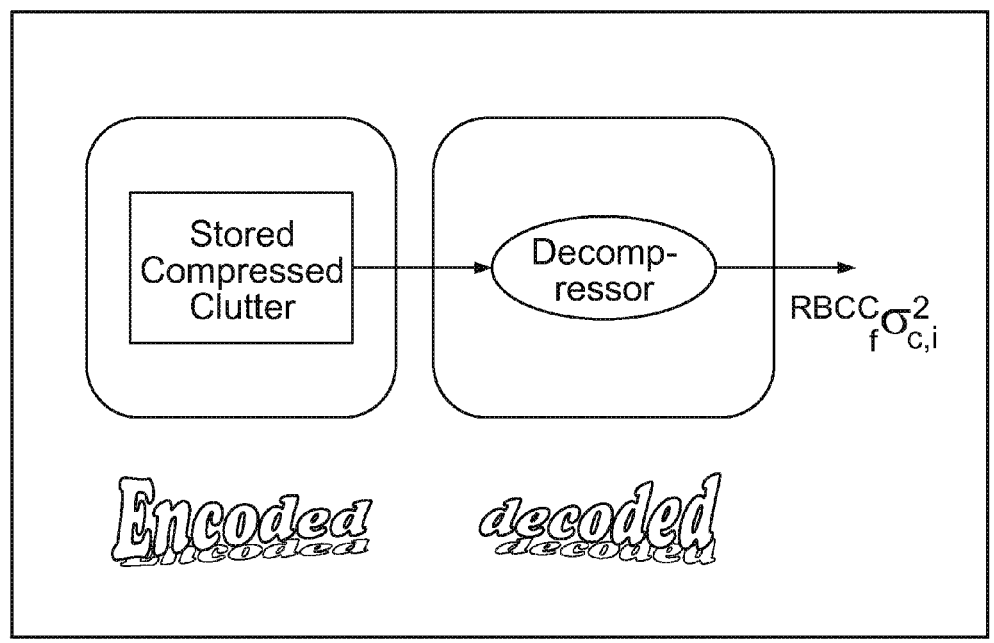
FIG. 10 depicts the structure of a radar-blind clutter coder in accordance with the present invention.

FIG. 10 illustrates the basic structure of a radar-blind clutter coder (RBCC), which includes an intelligence source coder containing the compressed or encoded clutter where the APRBG was not used. One advantage of a radar-blind clutter coder is that the compressed clutter can be used with any kind of AMTI radar system without regard to the actual APRBG environment. A clutter decompressor is included to derive an estimate for the uncompressed clutter for use by the conventional CCP or intelligence processor. The combination of the RBCC and conventional CCP is denoted here as RBCC-CCP for short. It has been found that this simple scheme generally does not produce a satisfactory SINR radar performance with reasonable compression ratios for SAR imagery.

Figure 11:
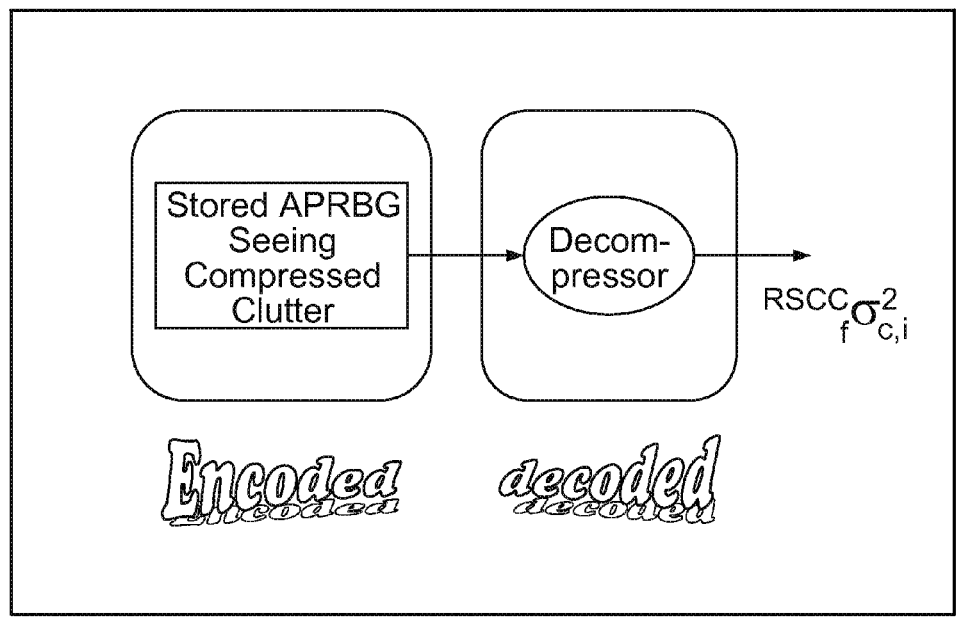
FIG. 11 depicts the structure of a radar-seeing clutter coder in accordance with the present invention.

FIG. 11 depicts the radar-seeing clutter coder (RSCC) structure, where the only difference from that of the radar-blind case of FIG. 10 is that the source-coder makes use of the APRBG. The combination of the RSCC and a conventional CCP is denoted as RSCC-CCP for short. It has been found that outstanding SINR radar performance is derived when SAR imagery is compressed from 4 MB to 512 bytes for a compression ratio of 8,192. The RSCC scheme requires that minimum and maximum CNR values be found for the SAR image when processed in any direction. In the example presented herein, 41 and 75 dB were used for these values, respectively, which are also noted to be in accord with the CNR plot of FIG. 9. Using these extreme CNR values, the front clutter source cell power $_f\sigma_{c,i}^2$ was generally in the range between 0.0077 and 7.7 which correspond to the minimum and maximum CNR values of 41 and 75 dB, respectively, as well as the assumed front global antenna gain given in Table 1. The resultant power limited SAR image was then compressed using standard compression schemes, e.g., PT source-coding.

Figure 17:
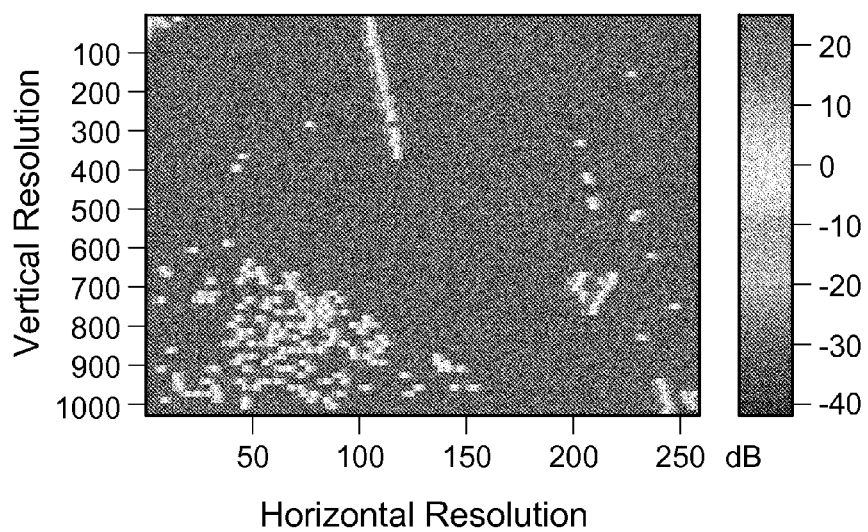
FIG. 17 depicts a 512 byte radar-blind PT decompressed SAR image.
Figure 20:
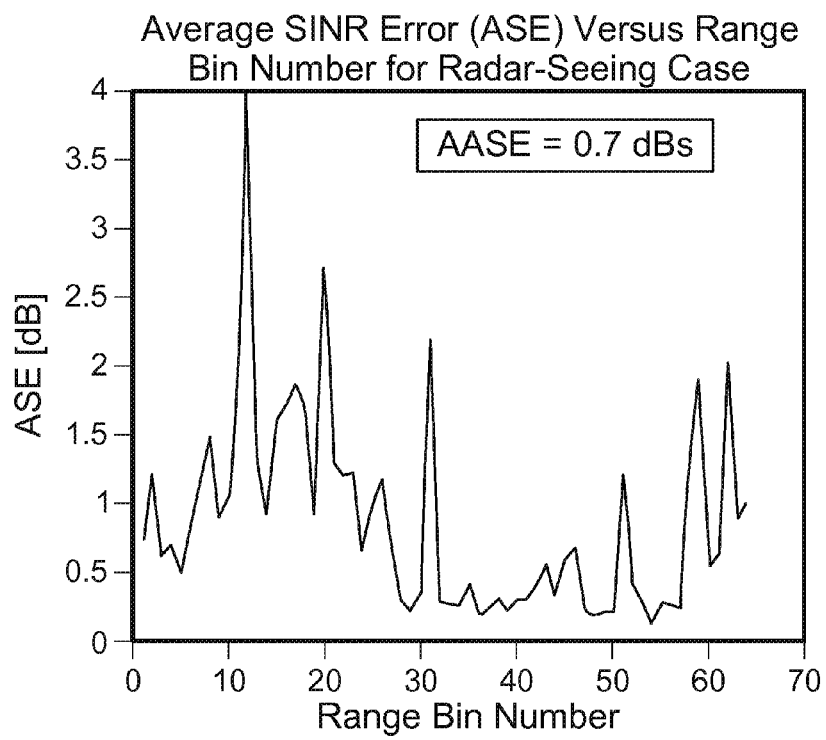
FIG. 20 illustrates the average SINR error versus range bin number for the radar seeing case.

In FIG. 17 a 512 byte radar-seeing PT decompressed SAR image is shown for a compression ratio of 8,192. In FIG. 20 the corresponding average SINR error is given for the 64 range-bins of FIG. 8. Note that this figure is characterized by a very small AASE value of approximately 0.7 dB. A comparison of FIG. 20 and FIG. 21 reveals that the radar-seeing scheme achieves much better SINR radar performance for the same amount of compression. However, it should be kept in mind, that this improvement is achieved at the expense of the prerequisite prior knowledge of the APRBG.

The clutter covariance processor compressor (CCPC) embodying the present invention achieves significant "on-line" (i.e., real time) computational time compression over the conventional clutter covariance processor or CCP. Simulations have shown that the CCPC is in fact the time compression dual of a space compression "lossy" source coder. The CCPC according to the present invention is eminently lossy since its output does not need to emulate that of the straight CCP. This is the case since its stated objective is to derive outstanding SINR radar performance regardless of how well its output compares with that of the local intelligence processor. It should be noted that the computational burden or time delay of the conventional CCP describing equations (2.14)-(2.15) is governed by the need to determine "on-line" the front clutter steering matrix Nc times, where each of these NM×NM dimensional matrices is weighted by the scalar and real cell power $p_c^f(\theta_c^i,\theta_t)$.

Furthermore, from expression (2.15) it is noted that the shape of the range bin cell power is a function of the antenna pattern $G_A^f(\theta_c^i,\theta_t)$ as well as the front clutter source cell power $_f\sigma_{c,i}^2$ which often varies drastically from range bin to range bin. Clearly, the variation of the clutter source cell power $_f\sigma_{c,i}^2$ from range bin to range bin is the source of the on-line computational burden associated with (2.14)-(2.15) since otherwise these expressions could have been solved off-line.

The on-line computational time delay problem of the conventional CCP is addressed in two steps, where each step has two parts.

Step I:

Part I.A External CCP Input: In this first part, a simple mathematical model for the external input of the CCP is sought. This external input is the clutter source cell power waveform $\{_f\sigma_{c,i}^2\}$ and its mathematical model is selected to be the power series $$K_0 + K_1 i + K_2 i^2 + \ldots, \quad (3.1)$$

where $K_j$ for all j are real constants that are determined on-line for each range bin using as a basis the measured input waveform $\{_f\sigma_{c,i}^2\}$. Since a desirable result is to achieve the smallest possible "on-line" computational time delay while yielding a satisfactory SINR radar performance, a single constant, $K_0$, has been selected to model the entire clutter source cell power waveform. The numerical value for $K_0$ is determined such that it reflects the strength of the clutter. The strength of the clutter, in turn, is related to the front clutter to noise ratio or $CNR^f$ defined earlier in (2.24) and plotted in FIG. 9 for the 64 range bins of FIG. 8. The $CNR^f$ will be one of two real and scalar values derived by the CCPC where it is assumed that the thermal white noise variance $\sigma_n^2$ is 1.

Part I.B Internal CCP Input: In this second and last part of Step I, a suitable modulation of the antenna pattern waveform $\{G_A^f(\theta_c^i,\theta_t)\}$ is sought. The modulation of this internal CCP input can be achieved in several ways. Two of them are: a) By using peak-modulation which consists of shifting the peak of the antenna pattern to some direction away from the target; and b) By using antenna elements-modulation which consists of widening or narrowing the antenna pattern mainbeam by modifying the number of "assumed" antenna elements N. It is emphasized here that these are only a mathematical alteration of the antenna pattern, since the true antenna pattern remains unaffected. Peak-modulation may be selected since, as mentioned earlier, the main objective is to achieve the smallest possible "on-line" computational delay for the computational time compressed CCP. Furthermore, to find the position to where the peak of the antenna pattern should be shifted to, the clutter cell centroid (CCC) or center of mass of the clutter is evaluated for each range bin. The CCC is the second of two scalar values derived by the CCPC and is given by the following expression $$CCC = \sum_{i=1}^{N_C} i \left( G_A^f(\theta_c^i, \theta_i)_f \sigma_{c,i}^2 \right) / CNR^f \bigg|_{\sigma_n^2 = 1} \quad (3.2)$$

Figure 12:
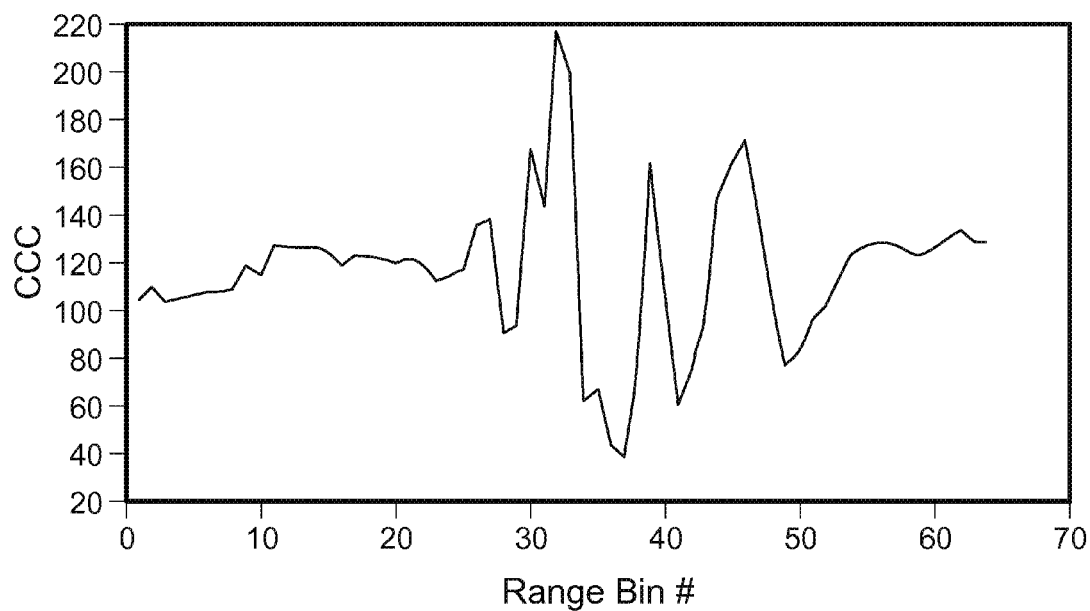
FIG. 12 is a clutter cell centroid plot of the range bins depicted in FIG. 8.

In FIG. 12 the CCC plot is shown for the 64 range bins of the SAR image given in FIG. 8. It should be noted that for many of the 64 range bins the CCC varies significantly from the position of the assumed target at 128.5 (0° from boresight). Clearly, for the isotropic clutter case the CCC will reside at boresight.

Step II

Part II.A Off-Line Evaluations: In this first part of Step II a finite and fixed number of predicted clutter covariances or PCCs are found off-line. This is accomplished using the CCP describing equations (2.14)-(2.15) subject to the simple clutter model (3.1) and a modulated antenna pattern which results in a small and fixed number of highly lossy clutter covariance realizations. The PCCs are derived from the following expressions:

$$PCC(k, j) = \sum_{i=1}^{N_C} p_{pc}^f(\theta_c^i, \theta_t, \theta^k, PCNR_j) c^f(\theta_c^i, \theta_A) c^f(\theta_c^i, \theta_A)^H \quad (3.3)$$

$$k = 1, \ldots, N_{SAP} \; \& \; j = 1, \ldots, N_{CNR}$$

$$p_{pc}^f(\theta_c^i, \theta_t, \theta^k, PCNR_j) = G_A^f(\theta_c^i - \theta^k, \theta_t) K_0(PCNR_j) \quad (3.4)$$

$$PCNR_j \in [PCNR_{Min}, \ldots, PCNR_{Max}] \quad (3.5)$$

where: a) $p_{pc}^f(.)$ is the predicted front clutter power; b) $G_A^f(\theta_c^i-\theta^k,\theta_t)$ is a shifted antenna pattern or SAP where the peak value of the actual antenna pattern (2.16) has been shifted from $\theta_c^i=\theta_t$ to $\theta_c^i=\theta_t+\theta^k$; c) $\theta^k$ denotes the amount of angular shift of the SAP away from the assumed target position $\theta_t$ (the SAPs are generally designed in pairs, one associated with $\theta^k$ and the other with $-\theta^k$); d) $N_{SAP}$ is the number of SAPs considered (in the simulations the cases with $N_{SAP}=1, 3$ and $5$ will be considered); e) $PCNR_j$ is the j-th predicted CNR value; e) $K_0(PCNR_j)$ is the PCC constant gain that gives rise to the $PCNR_j$; f) NCNR is the number of assumed PCNR values (predicted clutter to noise ratio) in the example presented herein, $N_{CNR}=2$); and f) $PCNR_{Min}$ and $PCNR_{Max}$ are minimum and maximum PCNR values, respectively, suitably evaluated for each SAR image (these values are 57 and 75 dB, respectively, for the SAR image presented herein).

Figure 13:
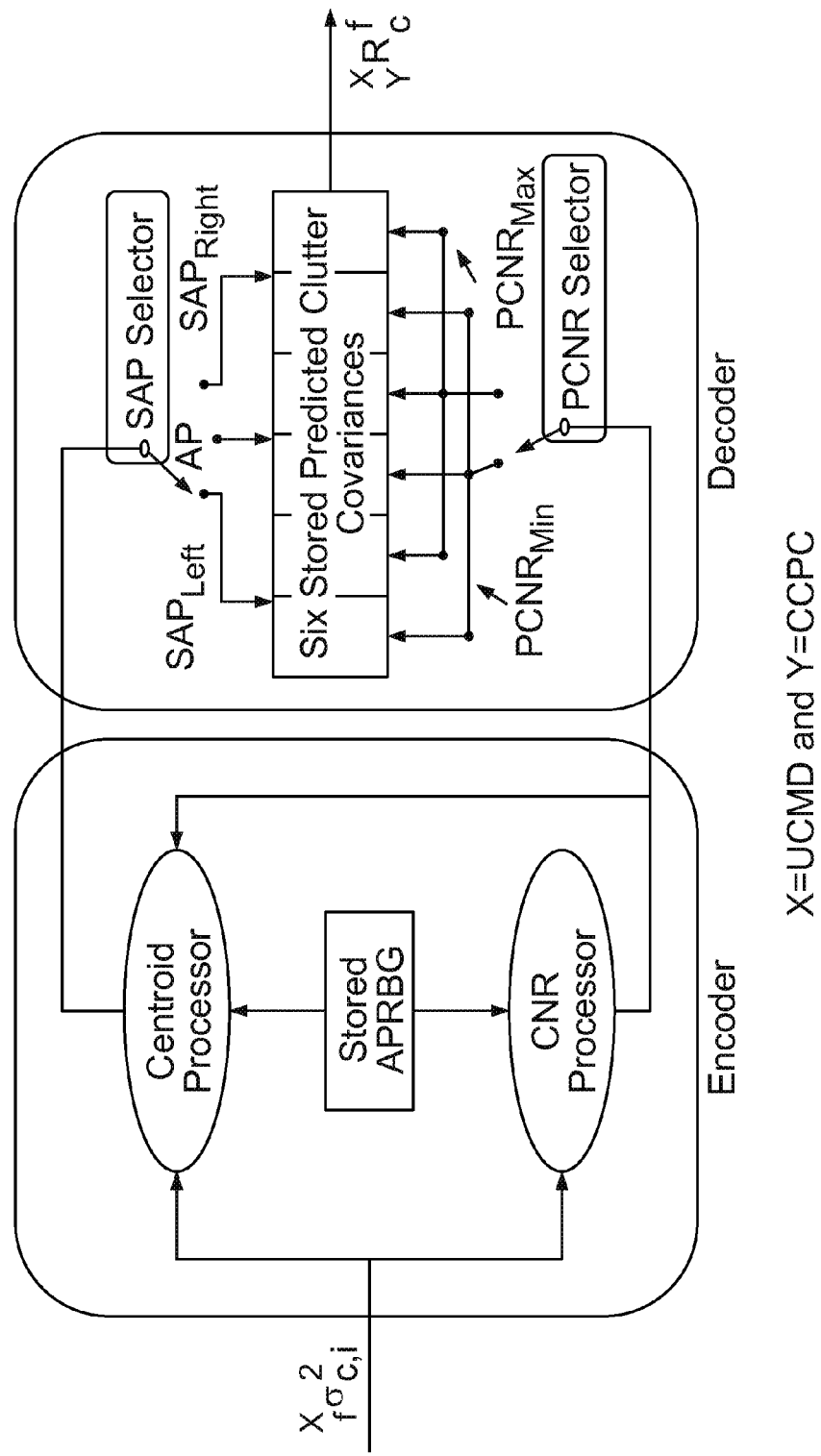
FIG. 13 is an embodiment of a clutter covariance processor component in accordance with the present invention.

In FIG. 13 the previously described CCPC is shown for the case where six predicted clutter covariances or PCCs are used. These PCCs were derived assuming three SAPs and two PCNRS. The SAPs were shifted to $-7°$ (cell 118 on the range bin), $0°$ (128.5) and $7°$ (139) from boresight and the PCNRs were 57 and 75 dB, respectively. The CCPC includes CNR and CCC processors where their input is given by the waveform $\{_f{}^X\sigma_{c,i}^2\}$ and $_f{}^X\sigma_{c,i}^2$ denotes the i-th front clutter source cell power corresponding to three different cases for X, which are as follows:

1. X=UCMD when the clutter emanates from the storage uncompressed clutter memory device (UCMD) of FIG. 3.
2. X=RBCC when the clutter is generated from the radar-blind clutter coder of FIG. 10.
3. X=RSCC when the clutter is derived from the radar-seeing clutter coder of FIG. 11.

After the CNR and CCC values are determined, the CCPC selects from the memory containing the 6 PCCs of FIG. 13 the one that is better matched to the measured CCC and CNR processor output values. For instance, if the CCC processor output is 140, the selection process is narrowed down to the pair of PCCs that were evaluated using the SAP that is shifted to position 139 on the range bin (or $+7°$), since it is the closest. In addition, if the measured CNR processor output is 60 dB the element of the selected PCC pair associated with the 75 dB PCNR is selected. It should be noted that the $PCNR_j$ selected is the one "above" the measured CNR processor output value.

At this point two observations are made. The first is that the Centroid and CNR Processors of FIG. 13 govern the time delay associated with the CCPC, and thus constitute a 'lossy processor encoder' since they encode in a lossy fashion the time delay essence, i.e., the ectropy, of the original CCP. The second observation is that the look up memory section of FIG. 13 is a 'lossy processor decoder' since it reconstructs a highly lossy version of the output of the original CCP.

Three space-time processors or SPTs are now described where the content of the UCMD is applied to three different types of CCPCs. The weighting vector w of the three STPs is described as follows $$w = [_{CCPC}^{UCMD} R]^{-1} s \quad (3.6)$$

$$_{CCPC}^{UCMD} R = R \big|_{R_c^f = _{CCPC}^{UCMD} R_c^f} \quad (3.7)$$

$$_{CCPC}^{UCMD} R_c^f \in \{PCC(k, j)\}\big|_{S_{CCPC}^{UCMD}} \quad (3.8)$$

where: a)

$$R\big|_{R_c^f = _{CCPC}^{UCMD} R_c^f}$$

is the total disturbance covariance (2.11)-(2.12) with the CCPC output of FIG. 13, $_{CCPC}^{UCMD} R_c^f$, replacing the front clutter covariance matrix $R_c^f$ in (2.12); and b) $S_{CCPC}^{UCMD}$ is the set of UCMD and CCPC parameters that define the specific CCPC case.

CCPC Case I

This first CCPC Case I has only one PCC pair and does not use any SAP since $\theta^1=0°$ which corresponds to the physically implemented antenna pattern of FIG. 5 which is directed towards boresight. The defining set $S_{CCPC}^{UCMD}$ is then given by the following expression:

$$S_{CCPC}^{UCMD}=\{_f\sigma_{c,i}^2, \theta^1=0°, PCNR_1=57 \text{ dBs}, PCNR_2=75 \text{ dBs}\} \quad (3.9)$$

CCPC Case II

This second CCPC Case II has three PCC pairs. One is associated with the antenna pattern of FIG. 5 and the other two with two different SAPs. The defining set $S_{CCPC}^{UCMD}$ is given by the following expression:

$$S_{CCPC}^{UCMD}=\{_f\sigma_{c,i}^2 \theta^1=-7°, \theta^2=0°, \theta^3=7°, PCNR^1=57 \text{ dBs}, PCNR_2=75 \text{ dBs}\} \quad (3.10)$$

CCPC Case III

This third CCPC Case III has five PCC pairs. One is associated with the antenna pattern of FIG. 5 and the other four with four different SAPs. The defining set $S_{CCPC}^{UCMD}$ is given by the following expression:

$$S_{CCPC}^{UCMP}=\{_f\sigma_{c,i}^2, \theta^1=-14°, \theta^2=-7°, \theta^3=0°, \theta^4=7°, \theta^5=14°, PCNR_1=57 \text{ dBs}, PCNR_2=75 \text{ dBs}\} \quad (3.11)$$

In FIGS. 14a-14d the simulation results for range bin #1 of FIG. 8 are presented for the above three cases, as well as the non knowledge-aided SPT sample matrix inverse (SMI) scheme described below $$w = [^{smi}R]^{-1} s \quad (3.12)$$

$$^{smi}R = \frac{1}{Lsmi}\sum_{i=1}^{Lsmi} X_i X_i^H + \sigma_{diag}^2 I \quad (3.13)$$

where $X_i$ denotes radar measurements from range bins close to the range bin under investigation, Lsmi is the number of measurement samples and $\sigma^2_{diag} I$ is a diagonal loading term. Xi was derived via the following generating equation $$X_i = R_i^{-1/2} x_i \quad (3.14)$$

where: a) xi is a zero mean, unity variance, NM dimensional complex random draw; and b) Ri is the total disturbance covariance (2.11)-(2.12) associated with the i-th range bin. For the example presented herein, $\sigma_{diag}^2 = 10$. For the results shown in FIG. 14, Lsmi=512 corresponding to 8 passes of the 64 range bins SAR image of FIG. 8. In addition, the radar and environmental conditions parameters assumed for all the simulations are given in Table 1 for ease of reference (note that no jammers are assumed in the simulations, however, it should also be kept in mind that outstanding SINR radar performance results are derived when there are jammers present).

Figure 14A:
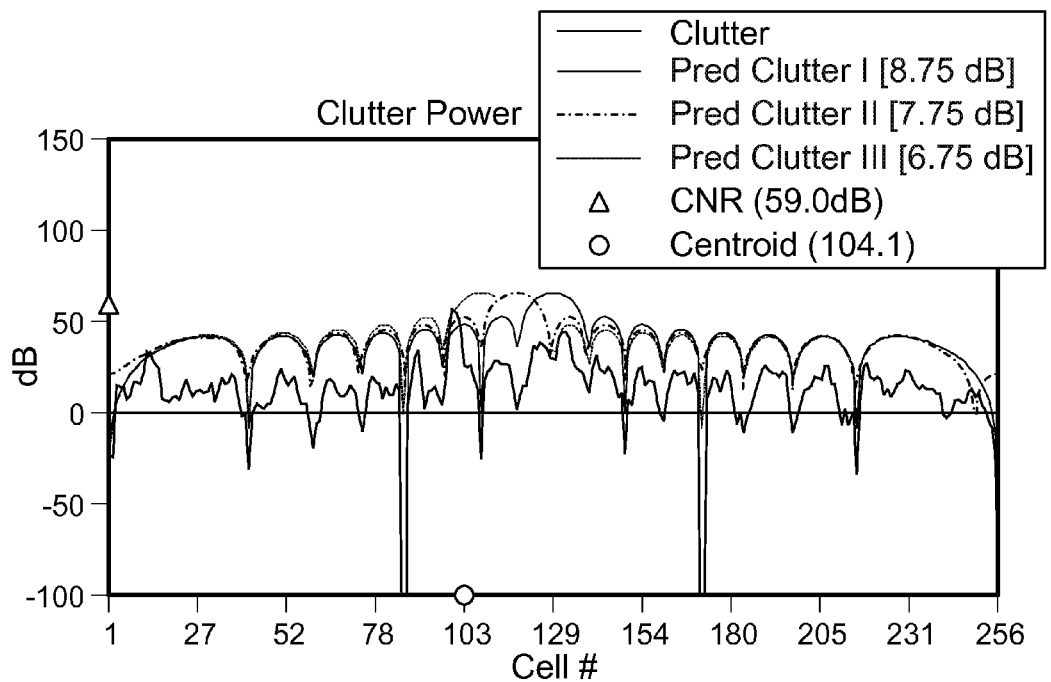
FIGS. 14a-14d illustrate the simulation results for range bin #1 of FIG. 8.

FIGS. 14a-14d are now explained in some detail. In FIG. 14a, the ideal front clutter average power $p_c^f(\theta_c^i, \theta_t)$ of (2.15) is plotted versus the range bin cell position. Note from FIG. 5 that range bin cell position 1 corresponds to −90°, 128.5 to 0° and 256 to +90° where all the angles are measured from boresight. Furthermore, the average power axis has been marked with the corresponding CNR of 59 dB and the cell position axis with the corresponding CCC of 104.1 which is also noted to reside 24.4 range bin cells away (−17.1°) from the assumed target location of 128.5 or 0°. The ideal clutter waveform is then contrasted with the predicted ones derived from (3.4) and linked to the selected PCC for each CCPC scheme.

Figure 14B:
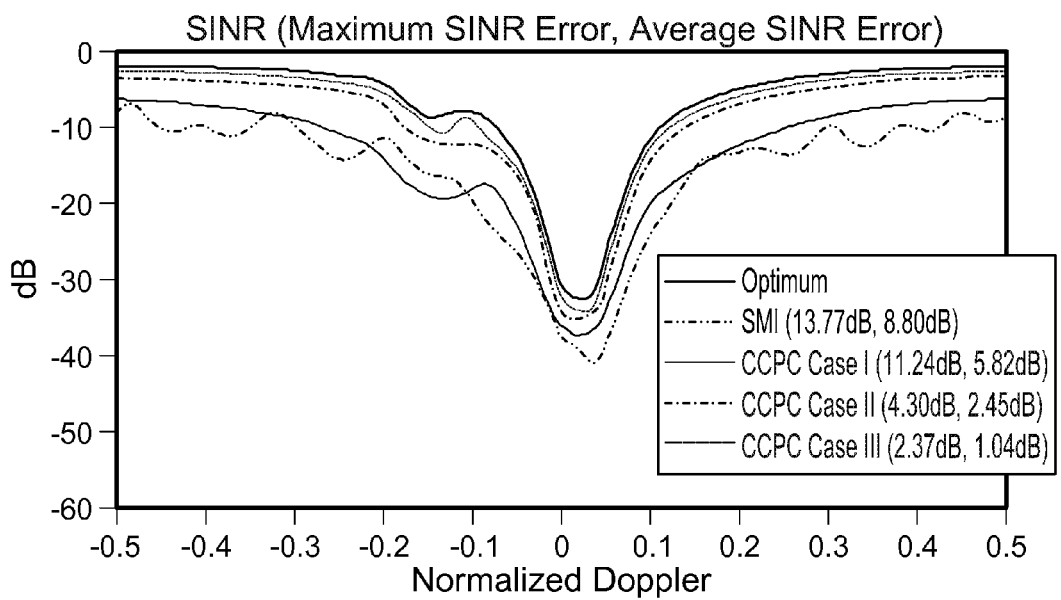
Figure 14C:
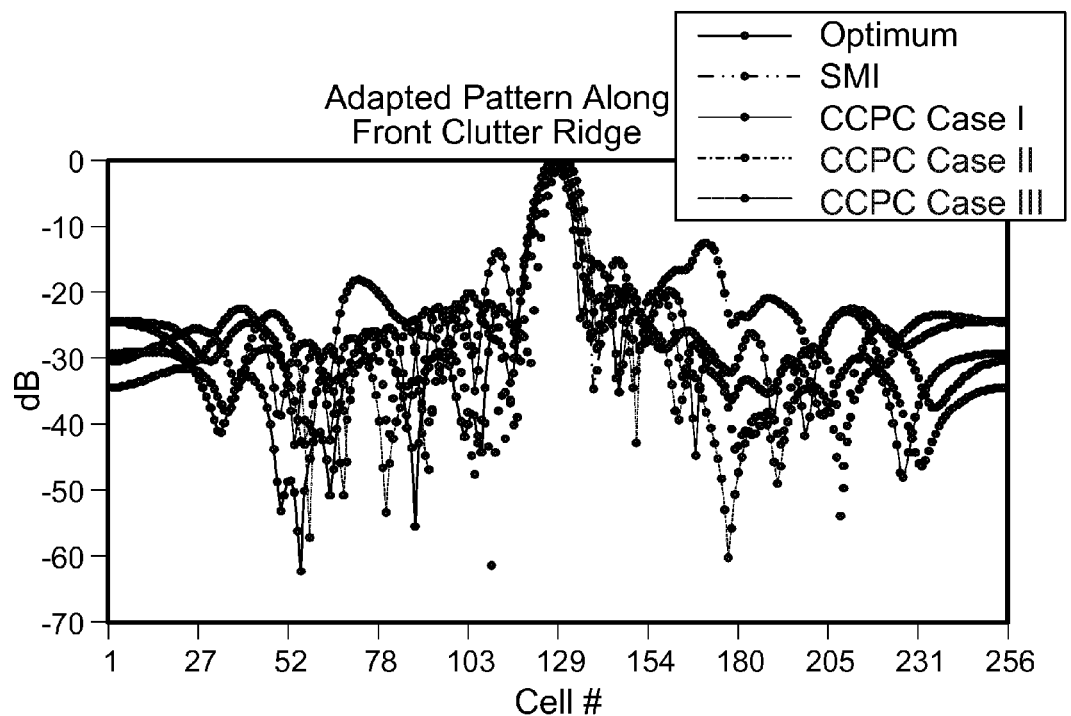
Figure 14D:
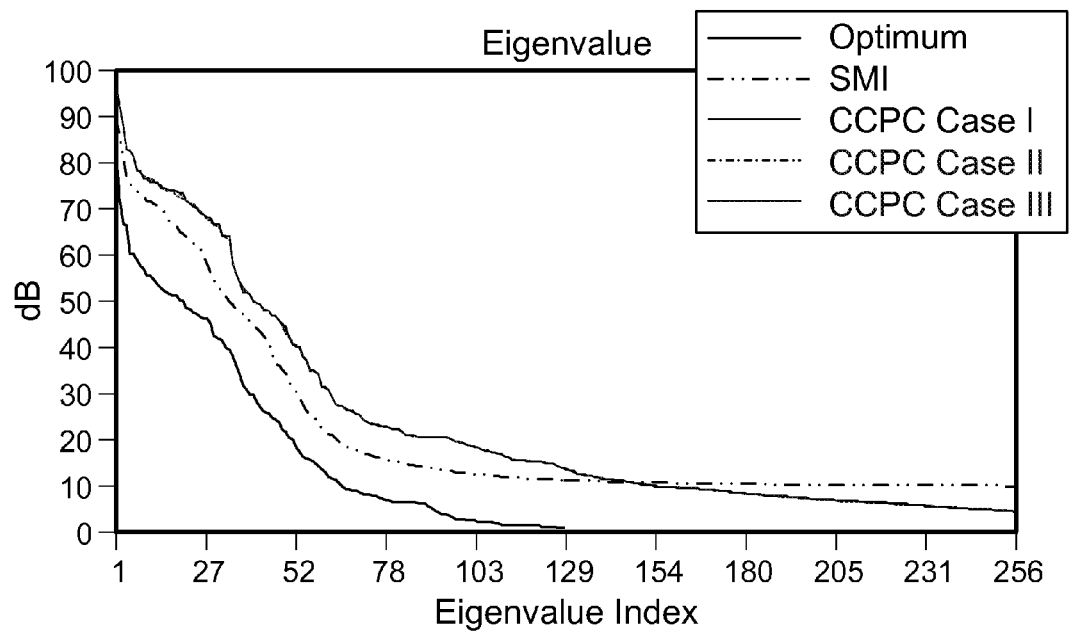

From FIG. 14a it is first noted how the front clutter average power $p_c^f(\theta_c^i, \theta_t)$ varies in dBs with respect to range bin cell position (note from FIG. 1 that range bin cell position 1 corresponds to −90°, 128.5 to 0° and 256 to +90°, all angles measured from boresight). In FIG. 14b the optimum and SMI SINR plots are displayed versus normalized Doppler. In FIG. 14c the SMI adapted pattern is given in dBs along the front clutter ridge which is described as follows $$AP(\theta_c^i, \theta_{AAM}, \beta, \theta_t, f_D^t) = 10 \log_{10} |w^H c_f(\theta_c^i, \theta_{AAM})|^2 \quad (3.15)$$

where $\theta_{AAM} = 2°$, $\beta = 1$, $\theta_t = 0$, $f_D^t = 0$, In FIG. 14d, the eigenvalues in dBs of the total disturbance covariance R are presented versus eigenvalue index for both the optimum and SMI schemes.

Figure 22:
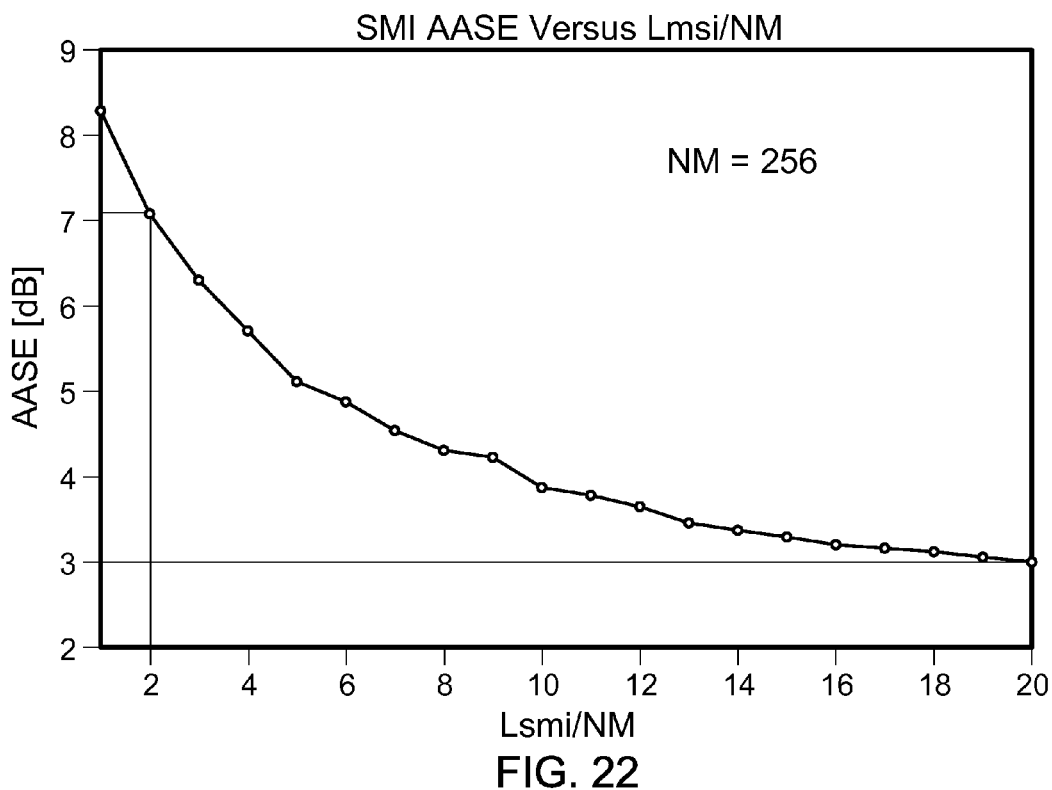
FIG. 22 is a plot of SMI-AASE as a function of the ratio of SMI samples.

FIG. 22 is a plot of SMI-AASE as a function of the ratio of SMI samples, Lsmi, over the number of STAP degrees of freedom NM. From this figure it is noted that this ratio must be equal to 20 (corresponding to 5,120 SMI samples), to achieve an AASE value of 3 dB which is, at least, a factor of 10 larger than that required if the SAR image had been of a homogeneous terrain. From this figure it is concluded that the derived SINR radar performance is not satisfactory for the SMI algorithm.

Figure 15:
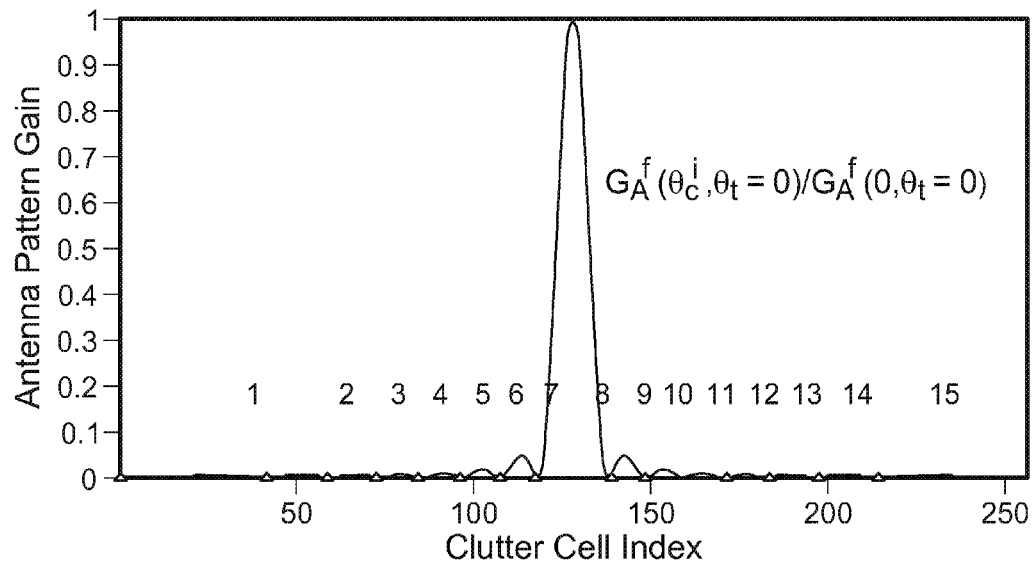
FIG. 15 depicts the antenna pattern of FIG. 5 in more detail.

Referring now to FIG. 14a, the legend "Pred Clutter I (8, 75.0 dB)" pertains to the front predicted clutter average power (3.4) for CCPC Case I. To understand the meaning of the ordered pair (8, 75.0 dB), reference is made to FIG. 15, which presents the front antenna pattern of FIG. 5 plotted in more detail as a function of cell location for any range bin. From this figure it is noted that there are 15 lobes (since the assumed number of antenna elements is N=16; see Table 1) where lobe 8 corresponds to the main lobe. In addition, this figure is characterized by the following set of zero crossings and mainlobe peak positions across the range-bin:

$$I = \begin{bmatrix} ZP^1, ZP^2, ZP^3, ZP^4, ZP^5, ZP^6, ZP^7, ZP^8, \\ ZP^9, ZP^{10}, ZP^{11}, ZP^{12}, ZP^{13}, ZP^{14}, ZP^{15} \end{bmatrix} \quad (3.16)$$

$$= \begin{bmatrix} 42, 59, 73, 85, 97, 108, 118, 128.5, \\ 139, 149, 160, 172, 184, 198, 215 \end{bmatrix} \text{cell position}$$

$$= \begin{bmatrix} -60.5, -48.5, -38.7, -30.2, -21.8, -14, \\ -7, 0, 7, 14, 21.8, 30.2, 38.7, 48.5, 60.5 \end{bmatrix} \text{degrees}$$

This set is then used to denote the possible directions to which the true antenna pattern of FIG. 5 can be shifted. Among these possible directions are those given in expressions (3.9)-(3.11) where SAPs are defined for three different CCPC cases. These directions can generally be anywhere in the specified range of cell locations from 1 to 256. In fact, numerous simulations have revealed outstanding SINR radar performance with directions that are anywhere in between the best two adjacent directions selected from (3.15). In other words, these directions have only been selected because they scan the entire range bin from cell 1 to cell 256 and have some connection to the lobes of the true antenna pattern. The ordered pairs appearing in FIG. 14a are explained as follows. The ordered pair (8, 75.0 dB) next to the title Pred Clutter I indicate that the SAP associated with the selected PCC of CCPC Case I of (3.9) is the physically implemented antenna pattern of FIG. 15 where the predicted clutter to noise ratio or PCNR is 75.0 dB. As a second example it is noted that the legend Pred Clutter II (7, 75.0 dBs) indicates that the plotted predicted clutter covariance power waveform corresponds to that of CCPC Case II of (3.10) where the antenna pattern had been shifted to −7° away from boresight and the PCNR is once again 75.0 dB.

In FIG. 14b the SINR results derived with each scheme are presented. The title for each legend is self explanatory, and the ordered pairs each indicate the maximum SINR error followed by the average SINR error. It should be noted that significantly better results are derived for CCPC Cases II and III than the SMI case and the CCPC Case I. Furthermore, it should be noted that CCPC Case III outperforms CCPC Case II by a relatively small amount. In FIG. 14c the adapted pattern corresponding to all contrasted cases is plotted. The adapted pattern is described as follows $$AP(\theta_c^i, \theta_{AAM}, \beta, \theta_t, f_D^t) = 10 \log_{10} |w^H c^f(\theta_c^i, \theta_{AAM})|^2 \quad (3.17)$$

where $\theta_{AAM} = 2°$, $\beta = 1$, $\theta_t = 0$, $f_D^t = 0$

Finally, in FIG. 14d the eigenvalues in dBs of the total disturbance covariance is plotted versus eigenvalue index for each case.

Figure 16A:
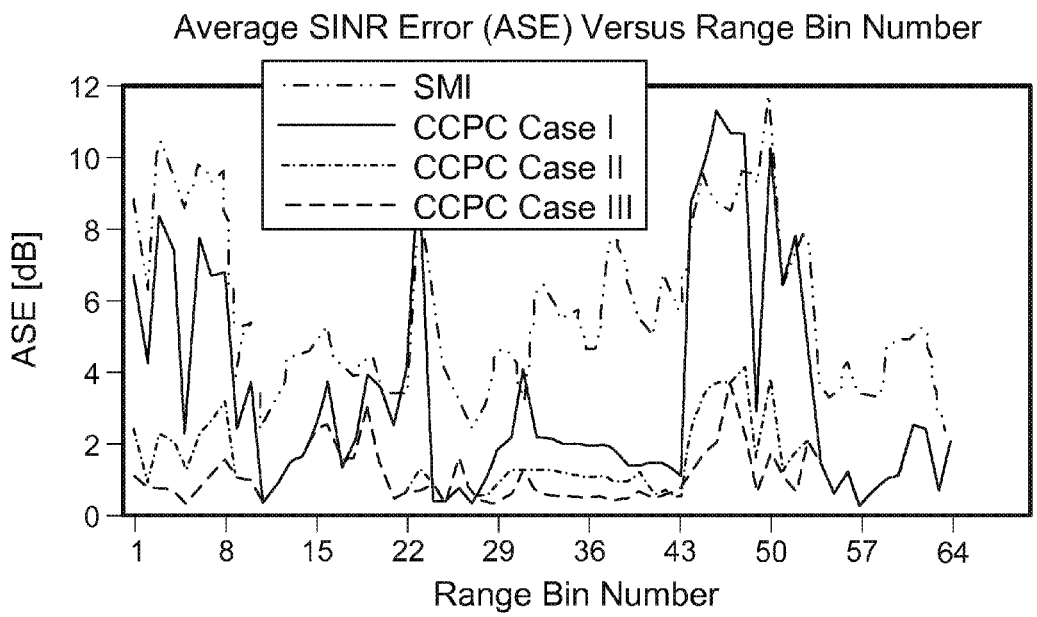
FIGS. 16a-16b depicts plots of the average and maximum SINR versus the range bins of FIG. 8.
Figure 16B:
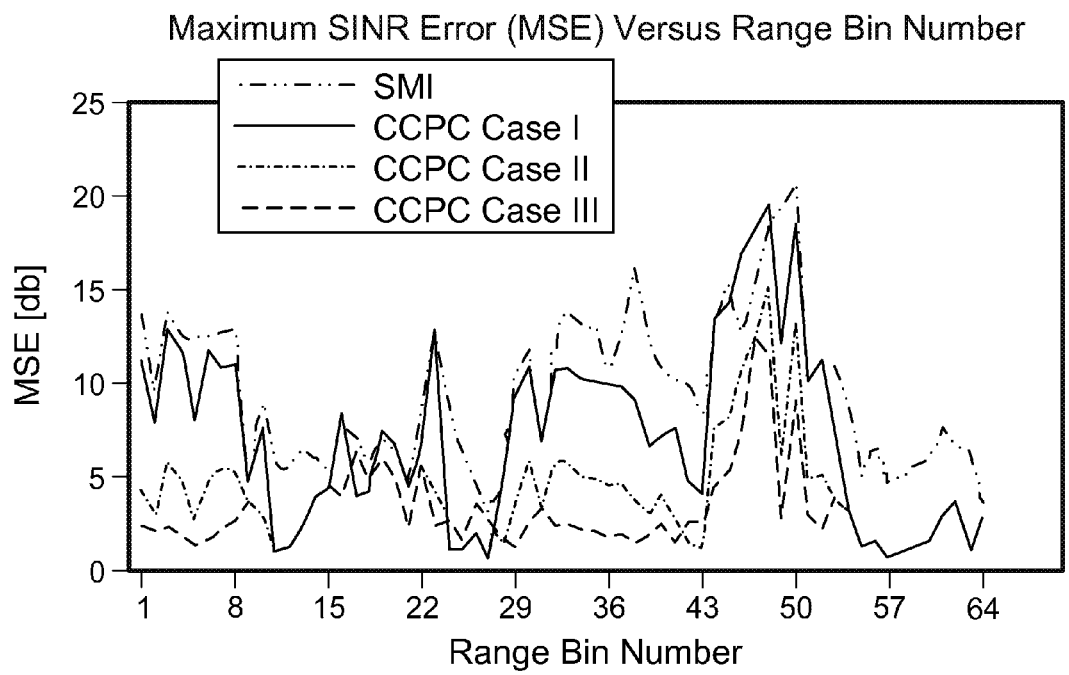

Referring now to FIGS. 16a and 16b, the average and maximum SINR errors are plotted versus the 64 range bins of FIG. 8. The results presented in FIGS. 16a and 16b correlate with those presented for range bin #1. In other words, it is concluded that CCPC Cases II and III (with average of average SINR error (AASE) values of 1.2 and 1.16, respectively) yield a satisfactory SINR performance while the SMI and CCPC Case I do not.

Integrated Clutter Compressor and CCP Compressor

The results that are derived when the output of the RBCC of FIG. 10 is used in conjunction with CCPC Case III defined by (3.11) with $f \sigma_{c,i}^2$ replaced with $f^{RBCC} \sigma_{c,i}^2$ are now discussed. The RBCC is of the predictive-transform type and compresses the SAR image from 4 MB to 512 bytes. In FIG. 17 the corresponding 512 byte radar-blind PT decompressed SAR image is shown.

Figure 21:
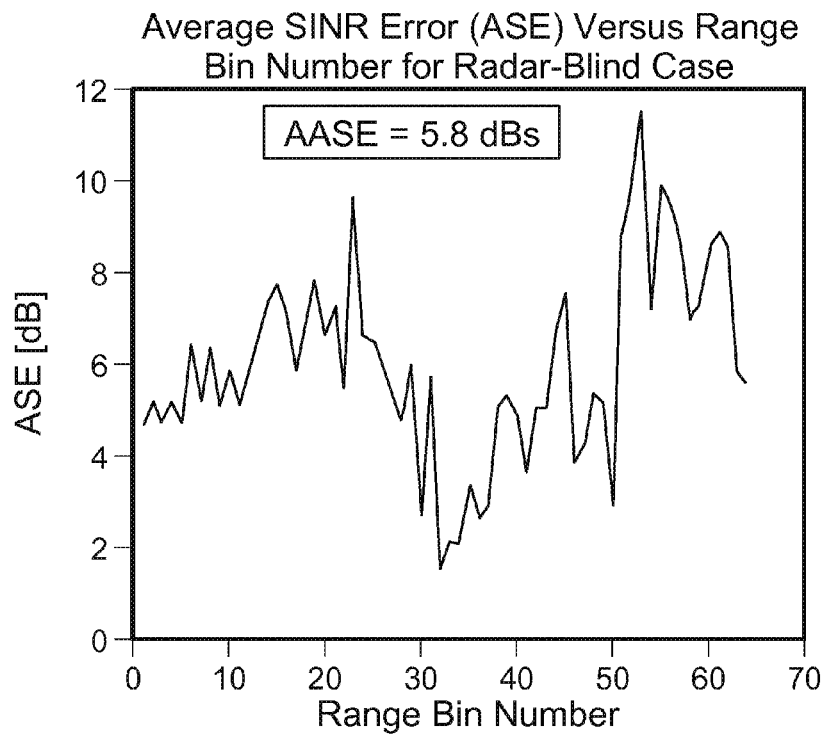
FIG. 21 illustrates the average SINR error versus range bin number for the radar blind case.

Referring now to FIG. 17, a 512 bytes radar-blind PT decompressed SAR image is shown. It should be noted that the amount of compression is very significant, i.e., a factor of 8,192, since the original SAR image was compressed from 4 MB to 512 bytes. This PT technique outperforms in signal to noise ratio (SNR) wavelets based JPEG2000 by more than 5 dBs. Referring now to FIG. 21, the corresponding average SINR error for all 64 range bins is presented An inspection of FIG. 21 reveals an AASE value of 5.8 dB which is unsatisfactory for a KA type technique. As mentioned earlier, this radar-blind technique becomes much more useful when the covariance processor of expressions (2.14)-(2.15) is replaced with a new type of covariance processor, a type that is derived using a novel processor coding methodology, which is the time compression dual of space compression source coding. A radar-seeing technique is next considered that yields significantly better results than that derived with the radar-blind technique but that requires knowledge of the antenna pattern and range bin geometry or APRBG.

Figure 18:
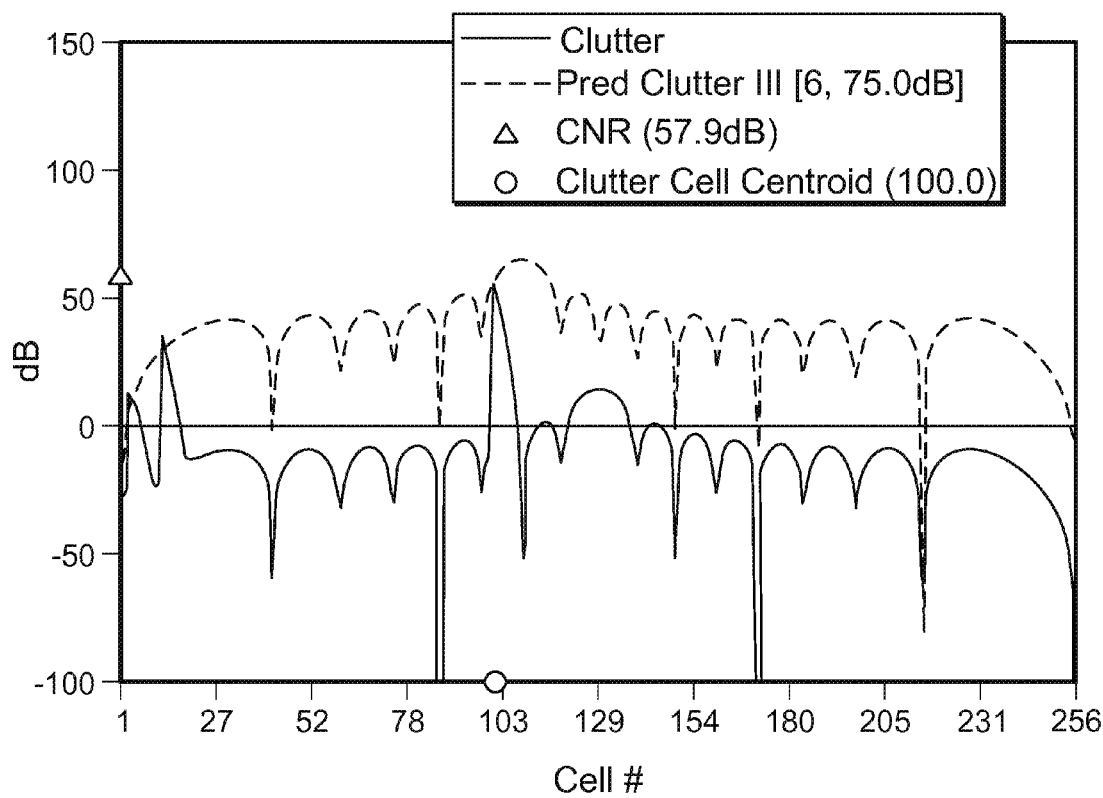
FIG. 18 illustrates the RBCC clutter average power for range bin 1 plotted versus clutter cell number.
Figure 19:
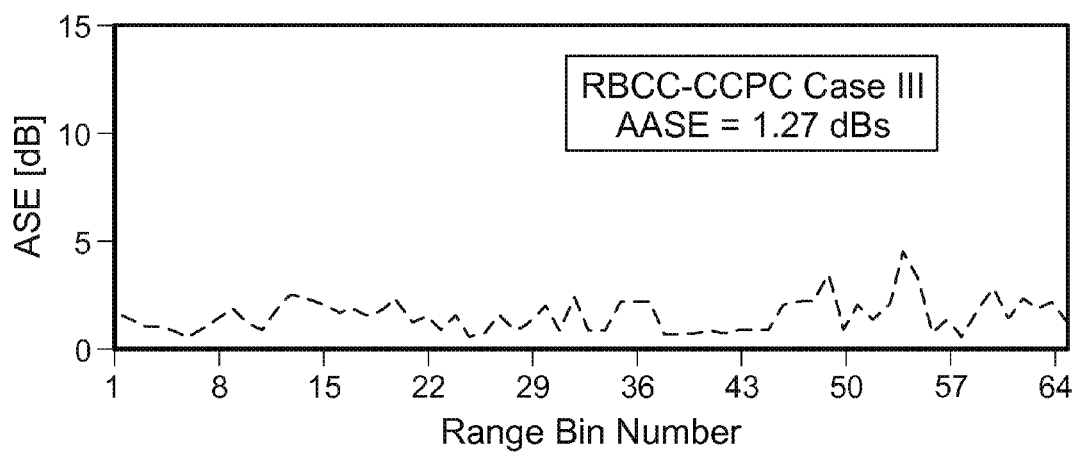
FIG. 19 illustrates the average SINR error for all 64 range bins.

Referring now to FIG. 18, for range bin 1 the RBCC clutter average power is plotted versus clutter cell number, as well as the associated predicted clutter average power for CCPC Case III. In FIG. 19, the average SINR error is presented versus all the 64 range bins where the AASE is given by 1.27 dB. It was found that when the conventional CCP was implemented with the RBCC scheme it yielded an AASE value of 5.8 dBs.

Finally, it should be noted that when the radar-seeing clutter coder or RSCC scheme with a compression ratio of 8,192 is combined with CCPC Case III, very close results to those obtained with the radar-blind case were obtained. As a result, it is concluded that the radar-blind scheme is preferred since besides being rather simple in its implementation it does not require any knowledge of the radar system where it will be embedded.

The examples presented in accordance with the present invention demonstrate that a SAR imagery clutter covariance processor appearing in KA-AMTI radar can be replaced with a fast clutter covariance processor resulting in outstanding SINR radar performance while processing clutter that had been highly compressed using a predictive-transform radar-blind scheme. The advanced fast covariance processor is a lossy processor coder that inherently arises as the time compression processor coding dual of space compression source coding. Since a more complex radar-seeing scheme generally did not significantly improve the results obtained with the radar-blind case, the radar-blind clutter compression method is preferred due to its simplicity and universal use with any type of radar system. In addition, since the fast clutter covariance processor output departed sharply from that of the significantly slower original clutter covariance processor, it is established that when designing a fast clutter covariance processor for a radar application it is unnecessary to be concerned about how well the output of the fast processor matches that of the slower original clutter covariance processor.

The emphasis before was in how well the fast signal processor output matches that of the slow original signal processor; however, now the emphasis is on how well the fast signal processor impacts the performance of the overall system. The approach of the present invention may also be utilized in more advanced 3-D scenarios.

A fundamental problem in source coding is to provide a replacement for the signal source, called a source coder, characterized by a rate that emulates the signal source entropy. This type of source coder is lossless since its output is the same as that of the signal source such as is the case with Huffman, Entropy, and Arithmetic coders. Another fundamental problem in source coding pertains to the design of lossy source coders that achieve rates that are significantly smaller than the signal source entropy. These solutions are linked to applications where the local signal to noise ratio (SNR) does not have to be infinite, or alternately, the global performance criterion of the application at hand is not the local SNR. An example of the latter is when synthetic aperture radar (SAR) imagery is compressed for use in knowledge-aided (KA) airborne moving target indicator (AMTI) radar. To address the lossy source coding problem, many techniques have been developed including the standards of JPEG, MPEG, wavelets based JPEG2000, and predictive-transform (PT) source coding.

Lossy PT source coding, in particular, is a source coding technique that is derived by combining predictive source coding with transform source coding using a minimum mean squared error (MMSE) criterion subjected to appropriate implementation constraints. A byproduct of this unifying source coding formulation is coupled Wiener-Hopf and eigensystem equations that yield the prerequisite prediction and transformation matrices for the PT source coder. The basic idea behind the PT source coder architecture is to trade off the implementation simplicity of a sequential predictive coder with the high speed of a non-sequential transform coder. Simplified decomposed PT structures are noted to arise when signals are symmetrically processed. A strip processor is an example of such processing. Furthermore, cascaded Hadamard structures are integrated with PT structures to accelerate the on-line evaluation of the necessary products between a transform or predictor matrix and a signal vector.

As shown and described herein, the excellent space compression achieved with lossy PT source coding is not affected by its integration with a very fast and simple bit planes methodology that operates on the quantized coefficient errors emanating from the PT encoder section. The efficacy of the methodology will be illustrated by compressing SAR imagery of KA-AMTI radar that is subjected to severely taxing environmental disturbances. In particular, it is found that PT source coding with bit planes significantly outperforms wavelets based JPEG2000 in terms of local SNR as well as global SINR radar performance.

Figure 23:
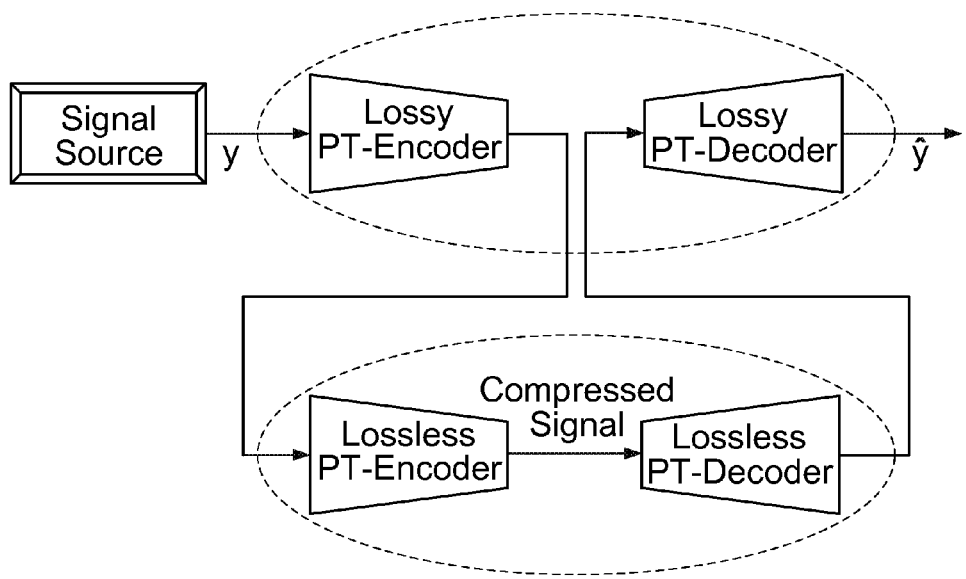
FIG. 23 is a block diagram of a PT source coder architecture.
Figure 24:
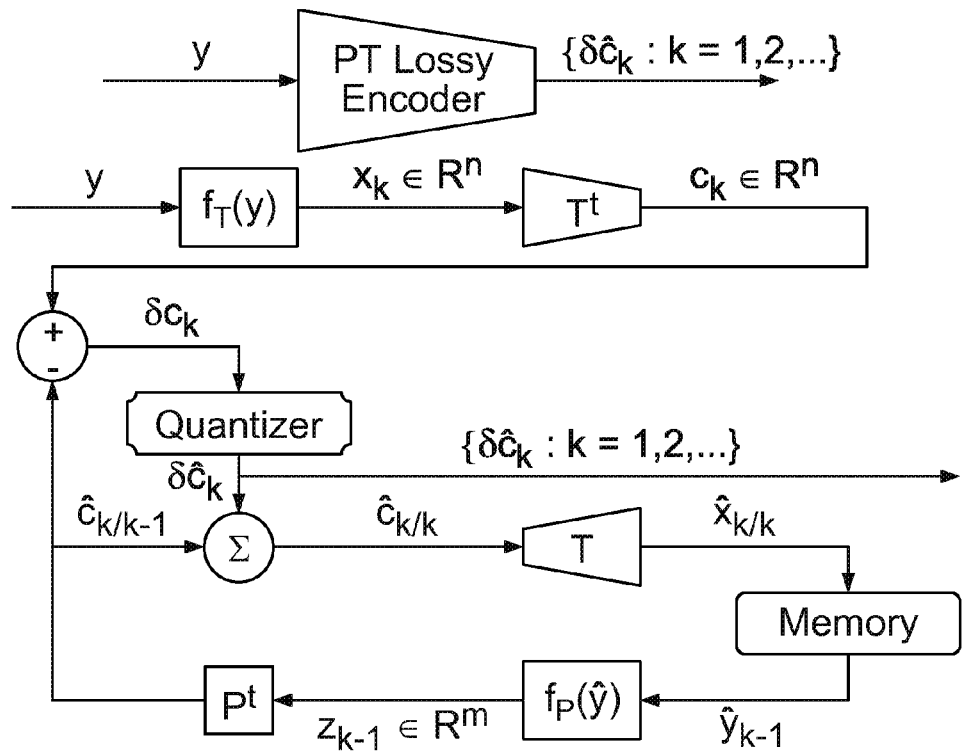
FIG. 24 is a block diagram of a lossy PT encoder.
Figure 25:
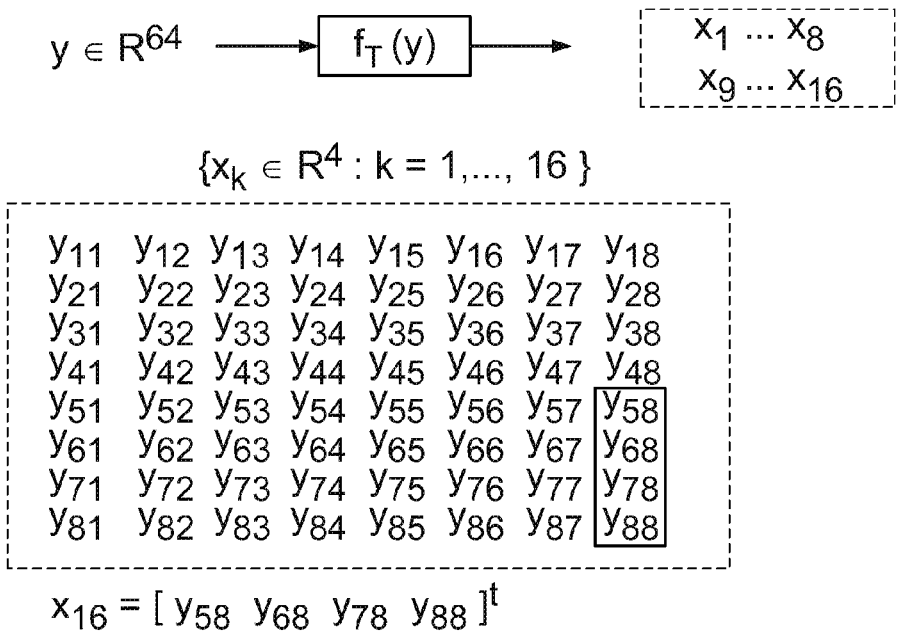
FIG. 25 is an illustration of transform pre-processing.

Referring now to FIG. 23, the overall PT source coder architecture is shown. It has as its input the output of a signal source y. As an illustration, this output will be assumed to be a real matrix representing 2-D images. The structure includes two distinct sections. In the upper section, the lossy encoder and associated lossy decoder are depicted while in the lower section the lossless encoder and decoder are shown. Before the lossless section of the coder is explained, which contains the offered bit planes, the lossy section will be reviewed. In FIG. 24, the lossy PT encoder structure is shown. It includes a transform pre-processor $f_T(y)$ whose output $x_k$ is a real n dimensional column vector. In FIG. 25 an image coding illustration is given where y is a matrix consisting of 64 real valued picture elements or pixels and the transform pre-processor produces sixteen n=4 dimensional pixel vectors $\{x_k: k=1, \ldots, 16\}$. The pixel vector $x_k$ then becomes the input of an n×n dimensional unitary transform matrix T. The multiplication of the transform matrix T by the pixel vector $x_k$ produces an n dimensional real valued coefficient column vector $c_k$. This coefficient, in turn, is predicted by a real n dimensional vector $\hat{c}_{k/k-1}$. The prediction vector $\hat{c}_{k/k-1}$ is derived by multiplying the real m dimensional output $z_{k-1}$ of a predictor pre-processor (constructed using previously encoded pixel vectors, as discussed below), by a m×n dimensional real prediction matrix P. A real n dimensional coefficient error $\delta c_k$ is then formed and subsequently quantized yielding $\delta \hat{c}_k$. The quantizer has two assumed structures. One is an "analog" structure that is used to derive analytical design expressions for the P and T matrices and another is a "digital" structure used in actual compression applications. The analog structure allows the most energetic elements of $\delta c_k$ to pass to the quantizer output unaffected and the remaining elements to appear at the quantizer output as zero values, i.e., $$\delta \hat{c}_k(i) = \begin{cases} \delta c_k(i) & i = 1, \ldots, d \\ 0 & i = d+1, \ldots n \end{cases} \tag{4.1}$$

The digital structure multiplies $\delta c_k$ by a real and scalar compression factor 'g' and then finds the closest integer representation for this real valued product, i.e., $$\delta \hat{c}_k = \lfloor g \delta c_k + \tfrac{1}{2} \rfloor \tag{4.2}$$

Figure 26:
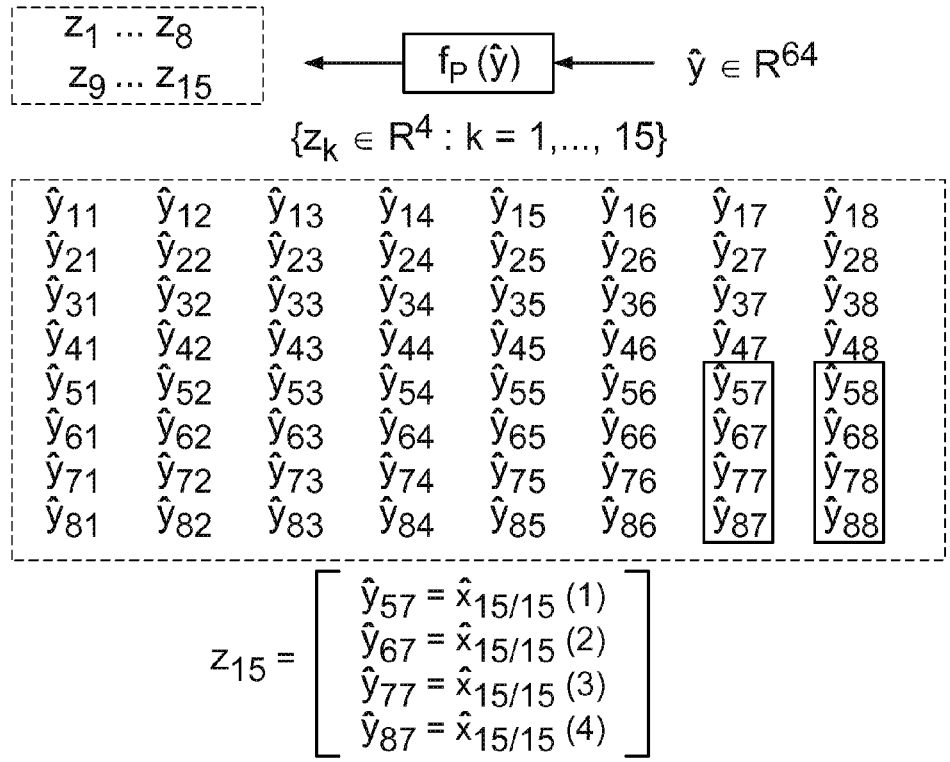
FIG. 26 is an illustration of predictive pre-processing.

The quantizer output $\delta \hat{c}_k$ is then added to the prediction coefficient $\hat{c}_{k/k-1}$ to yield a coefficient estimate $\hat{c}_{k/k}$. Although other types of digital quantizers exist, the quantizer used here (4.2) is simple to implement and yields outstanding results. The coefficient estimate $\hat{c}_{k/k}$ is then multiplied by the transformation matrix T to yield the pixel vector estimate $\hat{x}_{k/k}$. This estimate is then stored in a memory which contains the last available estimate $\hat{y}_{k-1}$ of the pixel matrix y. It should be noted that the initial value for $\hat{y}_{k-1}$, i.e., $\hat{y}_0$, can be any reasonable estimate for each pixel. For instance, since the processing of the image is done in a sequential manner using prediction from pixel block to pixel block, the initial $\hat{y}_0$ can be constructed by assuming for each of its pixel estimates the average value of the pixel block $x_1$. FIG. 26 shows for the illustrative example how the image estimate at processing stage k=16, i.e., $\hat{y}_{k-1} \hat{y}_{15}$, is used by the predictor pre-processor to generate the pixel estimate predictor pre-processor vector $z_{15}$. Also note from the same figure how at stage k=16 the 4 scalar elements ($\hat{y}_{57}$, $\hat{y}_{67}$, $\hat{y}_{77}$, $\hat{y}_{87}$) of the 8×8 pixel matrix $\hat{y}_{15}$ are updated making use of the most recently derived pixel vector estimate $\hat{x}_{15/15}$.

The design equations for the T and P matrices are derived by minimizing the mean squared error expression $$E[(x_k - \hat{x}_{k/k})^t (x_k - \hat{x}_{k/k})] \tag{4.3}$$

with respect to T and P and subject to three constraints. They are:

1) The elements of $\delta c_k$ are uncorrelated from each other.
2) The elements of $\delta c_k$ are zero mean.
3) The analog quantizer of (4.1) is assumed.

After this minimization is performed, the following coupled Wiener-Hopf and Eigensystem design equations are derived:

$$P = [I_m \ 0_{m \times 1}] JT, \tag{4.4}$$

$$\{E[x_k x_k^t] - E[x_k z_{k-1}^t] E[x_k]\} JT = T\Lambda \tag{4.5}$$

$$J = \begin{bmatrix} E[z_{k-1} z_{k-1}^t] & E[z_{k-1}] \\ E[z_{k-1}^t] & 0 \end{bmatrix}^{-1} \begin{bmatrix} E[z_{k-1} x_k^t] \\ E[x_k^t] \end{bmatrix} \tag{4.6}$$

where these expressions are a function of the first and second order statistics of $x_k$ and $z_{k-1}$ including their cross correlation. To find these statistics the following isotropic model for the pixels of y can be used:

$$E[y_{ij}] = K, \tag{4.7}$$

$$E[(y_{ij} - K)(y_{i+v,j+h} - K)] = (P_{avg} - K^2) \rho^D \tag{4.8}$$

$$\rho = E[(y_{ij} - K)(y_{i,j+1} - K)]/(P_{avg} - K^2)$$

$$D = \sqrt{(rv)^2 + h^2} \tag{4.9}$$

where v and h are integers, K is the average value of any pixel, $P_{avg}$ is the average power associated with each pixel, and r is a constant that reflects the relative distance between two adjacent vertical and two adjacent horizontal pixels (r=1 when the vertical and horizontal distances are the same).

Figure 27:
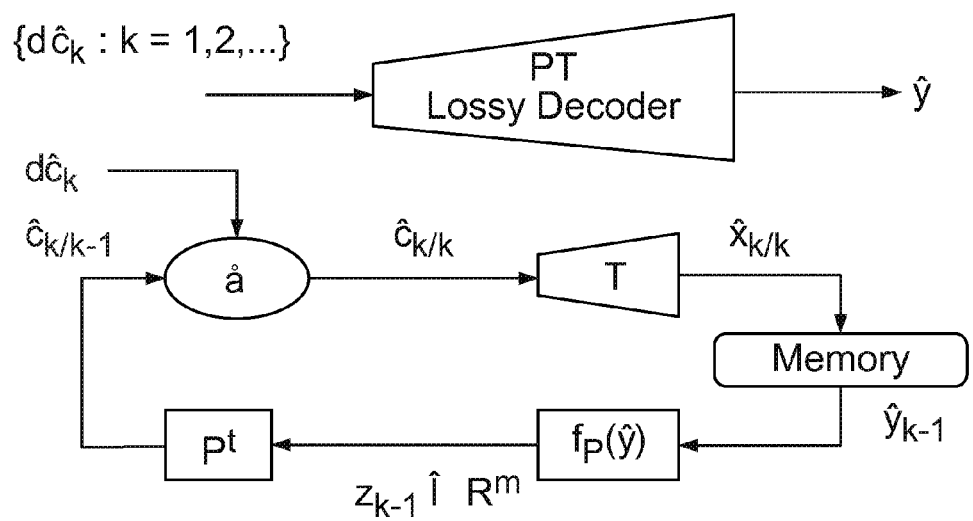
FIG. 27 is a block diagram of a lossy PT decoder.

In FIG. 27 the lossy PT decoder is shown.

Bit Planes

Figure 28:
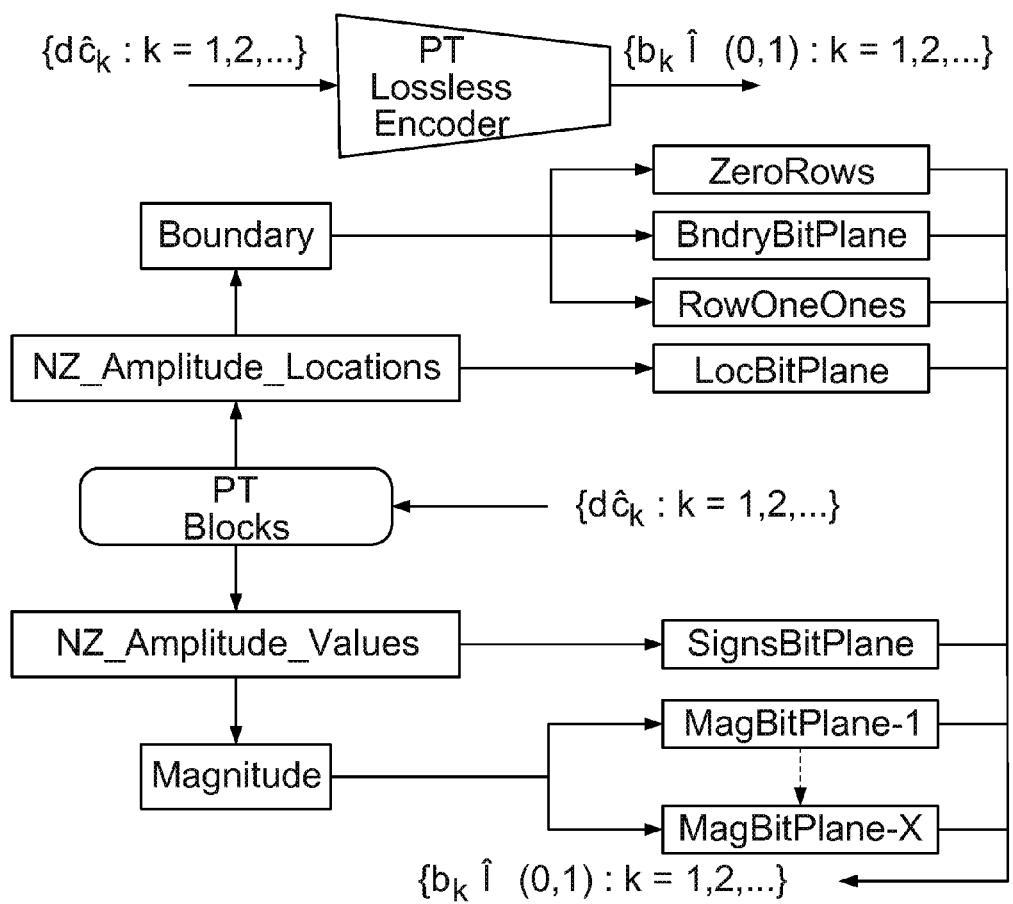
FIG. 28 is a block diagram of a lossless PT encoder.
Figure 29:
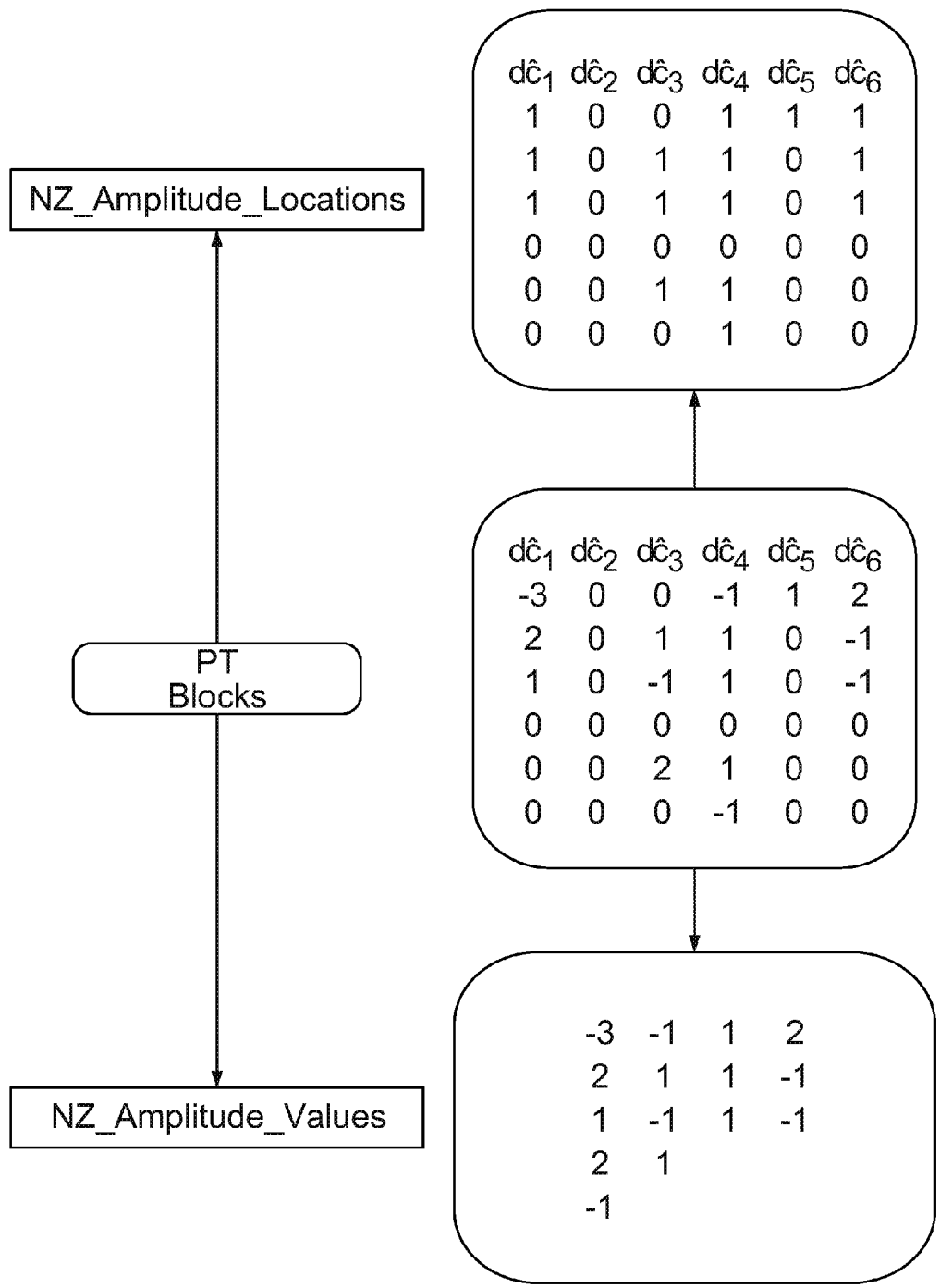
FIG. 29 is an illustration of PT block decomposition.

The general architecture of the lossless PT encoder is shown in FIG. 28, which has as input the digitally quantized coefficient error sequence $\{\delta \hat{c}_k : k=1, \ldots, N_B\}$ where $N_B$ is the total number of coefficient error vectors needed to encode the 2-D image y. The output of the lossless PT coder is the desired bit stream $\{b_j \in (0,1): j=1, 2, \ldots, N_b\}$ where $N_b$ is the number of bits generated by the lossless PT encoder prior to its further encoding using a lossless source coding scheme such as an Arithmetic coder. The coefficient error sequence forms what is called in the figure PT Blocks which is a matrix of dimension $n \times N_B$. In FIG. 29, an illustrative example is presented where n=6 and $N_B$=6. The most energetic element of each quantized coefficient error is found in the first row of PT Blocks, i.e., in the row {−3 0 0 −1 1 2}, and the least energetic one is found in the last row, i.e., the row {0 0 0 −1 0 0}.

The PT Blocks are then decomposed into NZ_Amplitude_Locations and NZ_Amplitude_Values. NZ_Amplitude_Locations is an $n \times N_B$ dimensional matrix that conveys information about the location of the nonzero (NZ) amplitudes found in PT Blocks. From the simple example of FIG. 29, it is noted that all nonzero elements of PT Blocks are replaced with a 1. NZ_Amplitude_Values, on the other hand, retain the actual values of the nonzero amplitudes. In FIG. 29, these amplitudes are shown for the example where it is noted that the number of elements in each row is not constant and also that no elements are displayed corresponding to the fourth row of PT Blocks since this row is made of zero values only.

Referring now to FIG. 28, it is noted that the NZ_Amplitude_Locations matrix is now split up into a Boundary matrix and a LocBitPlane block. The Boundary matrix is associated with the location where the zero runs begin in the direction from top to bottom of each column of the NZ_Amplitude_Locations matrix. LocBitPlane, on the other hand, are the bits that remain after the 1's followed by zero runs of the Boundary matrix are eliminated from the NZ_Amplitude_Locations matrix.

Figure 30:
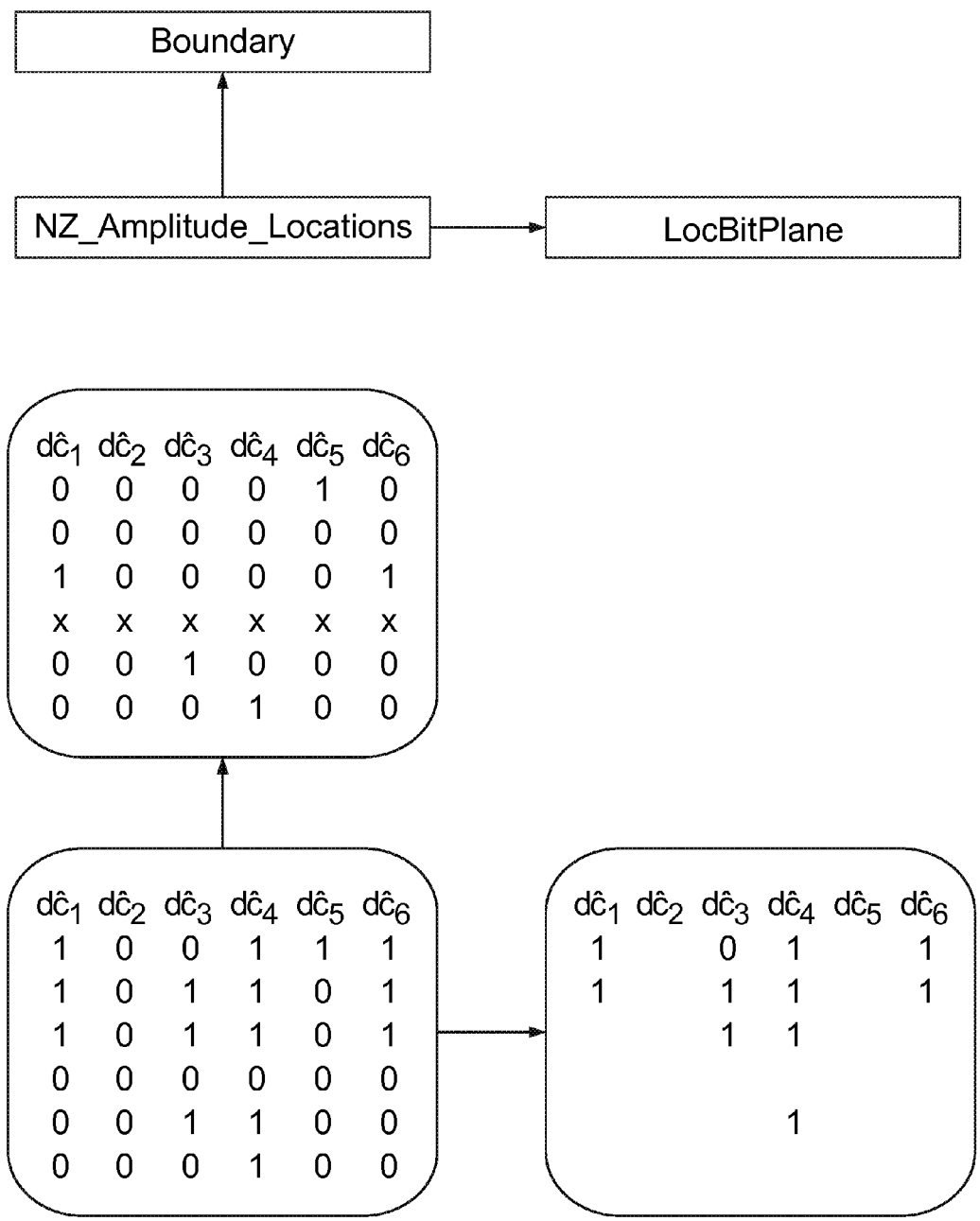
FIG. 30 is an illustration of amplitude location decomposition.

In FIG. 30, this decomposition is illustrated for the running example. It should be noted that the Boundary matrix has three symbols. They are 0, 1 and X. The symbol X is used for the elements of a row whose values are all zero, and thus it informs about a zero row. The symbol 1 does not appear more than once for each column and specifies a boundary location where the zero run begins for that particular column. For example, since the zero run starts at row 4 for the first column, the 1 is placed on the third row just prior to the beginning of the zero run. The aforementioned LocBitPlane is also illustrated in FIG. 30. It should be noted how for the third column only the bits {0 1 1} are listed and the zero for the fourth row is ignored since this information is available from the encoding of the Boundary matrix.

Referring now to FIG. 28, it is noted that the Boundary matrix is decomposed into three blocks. They are the blocks ZeroRows, BndryBitPlane and RowOneOnes. This decomposition is best explained with the illustrative example of FIG. 31. From this figure it is noted that ZeroRows assigns a 0 to a row of the Boundary matrix if it is composed of the special symbol X, otherwise it assigns a 1 to the row. BndryBitPlane is the same as Boundary matrix except that all rows made up of the special symbol X are removed. In addition, BndryBitPlane replaces a 0 with a 1 in the first row of a column with a full zero run. See for example the second column of the Boundary matrix which has a full zero run and for which a 1 has been placed on the first row of the column. Finally, RowOneOnes keeps track of the ones in the first row of BndryBitPlane that arose from replacing a 0 with a 1 as mentioned earlier. This completes the encoding of the NZ_Amplitude_Locations matrix of FIG. 28 into bit planes. Next the same is accomplished with the NZ_Amplitude_Values block of FIG. 28 which was illustrated in FIG. 29.

Figure 32:
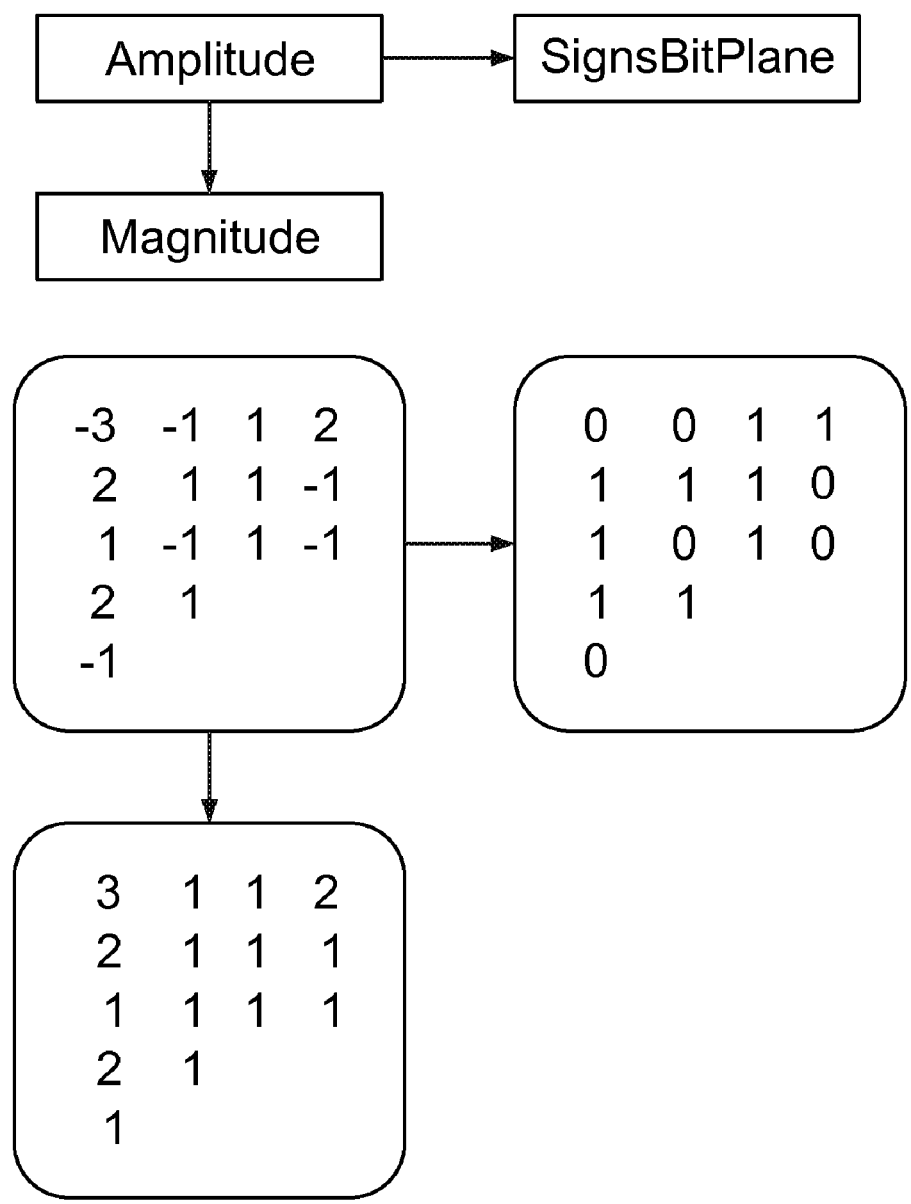
FIG. 32 is an illustration of amplitude decomposition.
Figure 33:
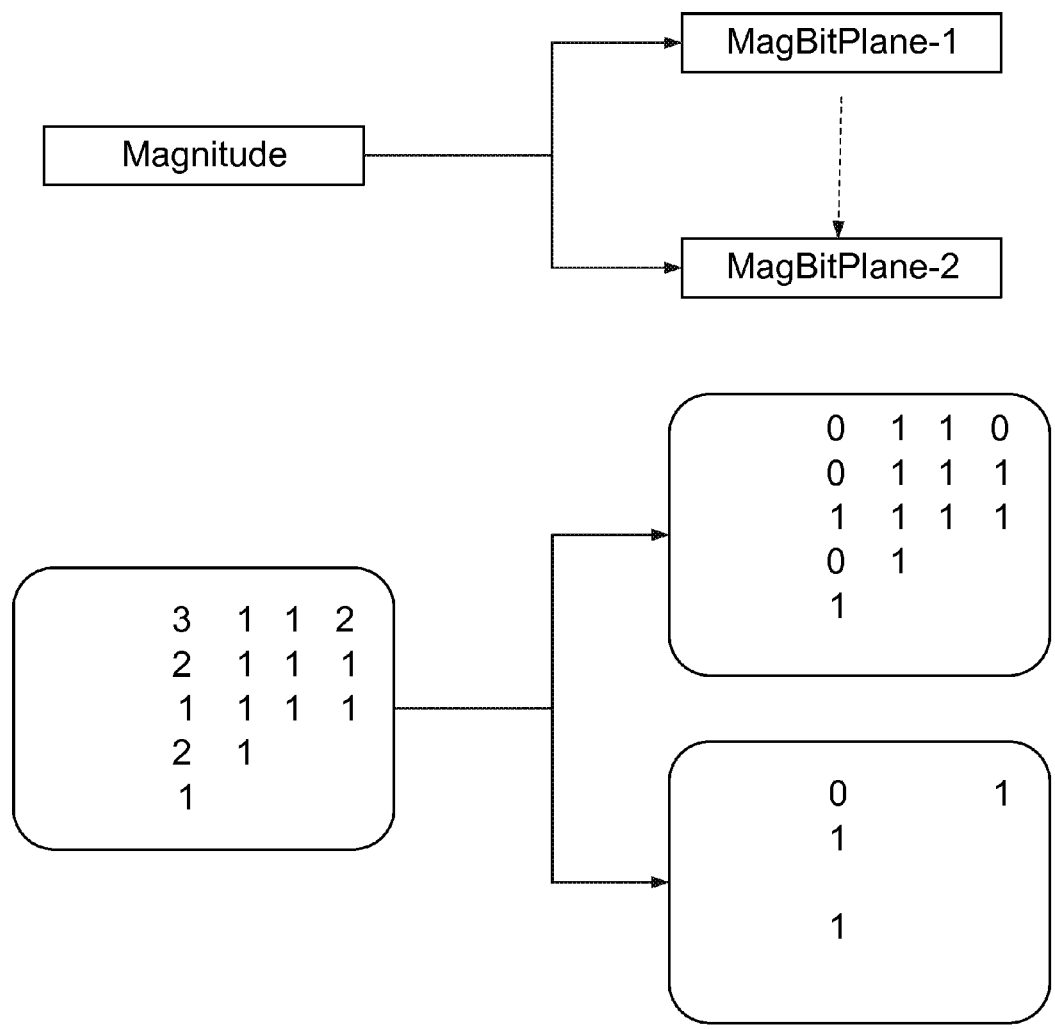
FIG. 33 is an illustration of magnitude decomposition.

From FIG. 28 it is noted that NZ_Amplitude_Values is decomposed into two blocks. One is a Magnitude block and the other is a SignsBitPlane block. The nature of these two blocks is illustrated in FIG. 32, where the SignsBitPlane block assigns a zero to a negative integer value and a one to a positive integer value. The Magnitude block is self explanatory. Returning to FIG. 28 it is noted that the Magnitude block is decomposed into X MagBitPlane blocks. Each of these component blocks are readily explained via the illustrative example of FIG. 33. It is first noted that since the maximum integer value for the Magnitude block is 3 there will be 3−1=2 MagBitPlane blocks (it should be noted, however, that if the integer value 2 did not appear in the Magnitude block only one MagBitPlane block is needed with this information sent to the decoder as overhead). MagBitPlane-1 is noted from FIG. 33 to assign a 1 to the integer of magnitude 1 and a 0 to the other cases. On the other hand, MagBitPlane-2 ignores all integers with a magnitude of one, and assigns a 1 to the integers with a magnitude of 2 and a 0 to the remaining integers. At this point, there are the necessary stream of ones and zeros that can then be appropriately encoded using a lossless encoder such as an Arithmetic encoder whose output is then sent to the lossless PT decoder.

Figure 31:
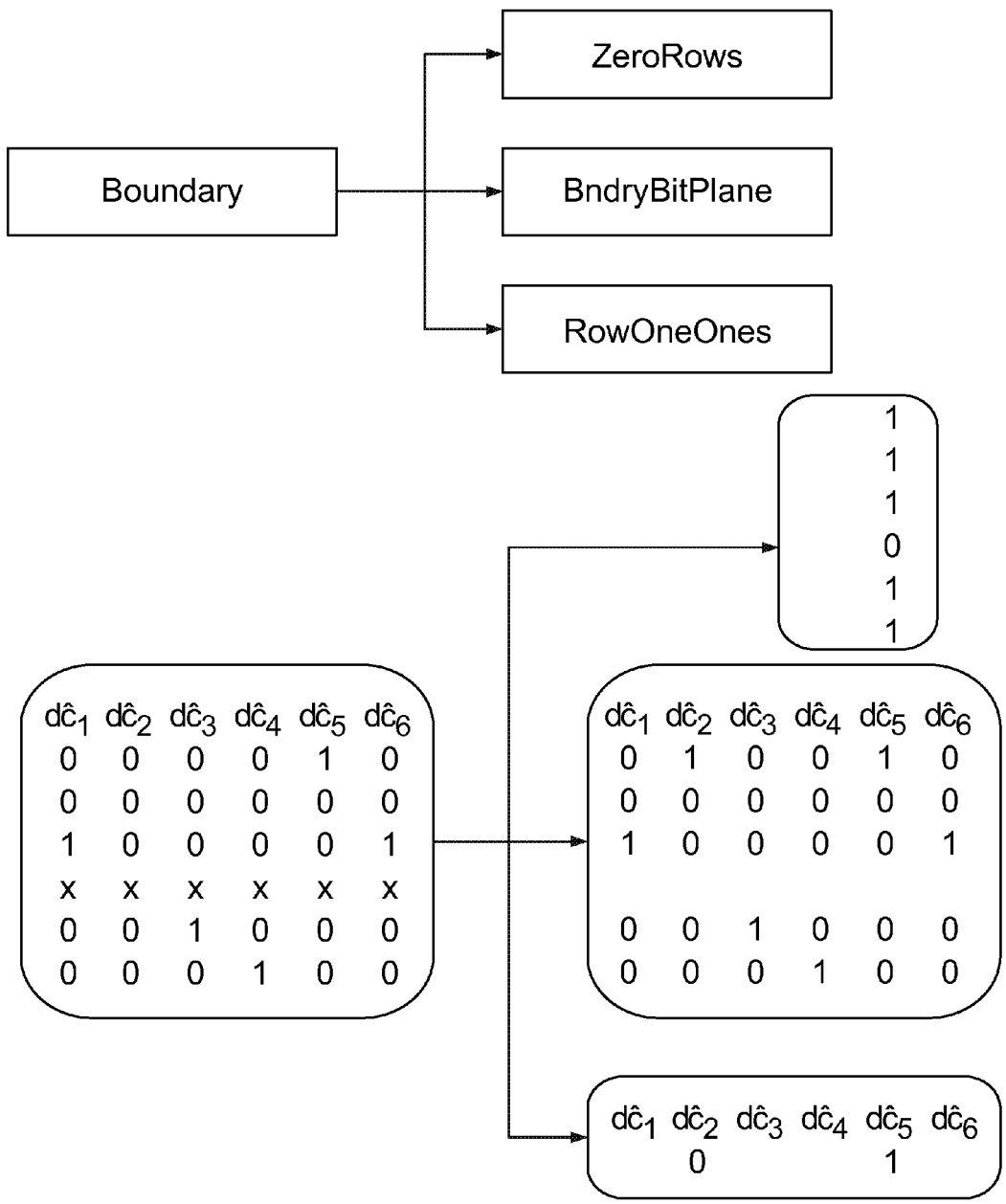
FIG. 31 is an illustration of boundary decomposition.
Figure 34:
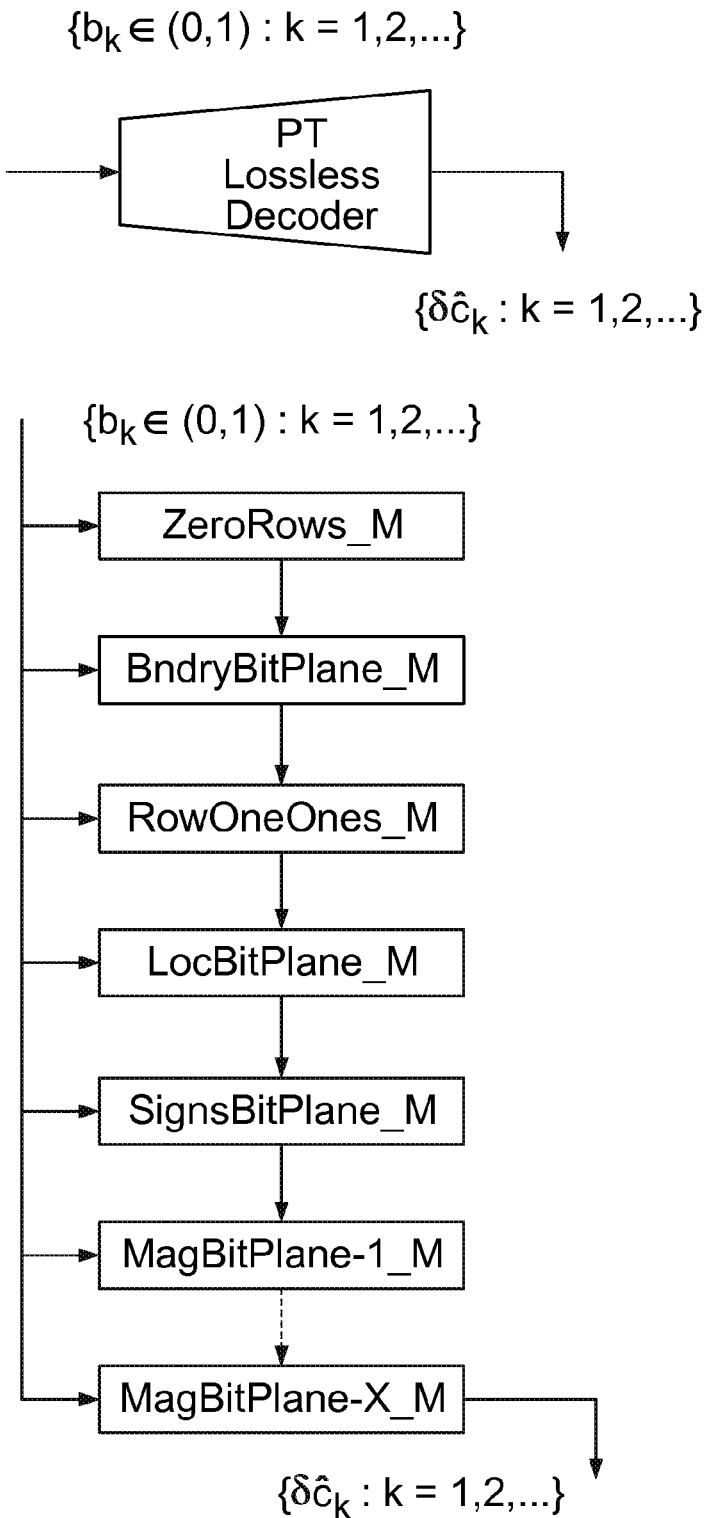
FIG. 34 is a block diagram of a lossless PT decoder.
Figure 35:
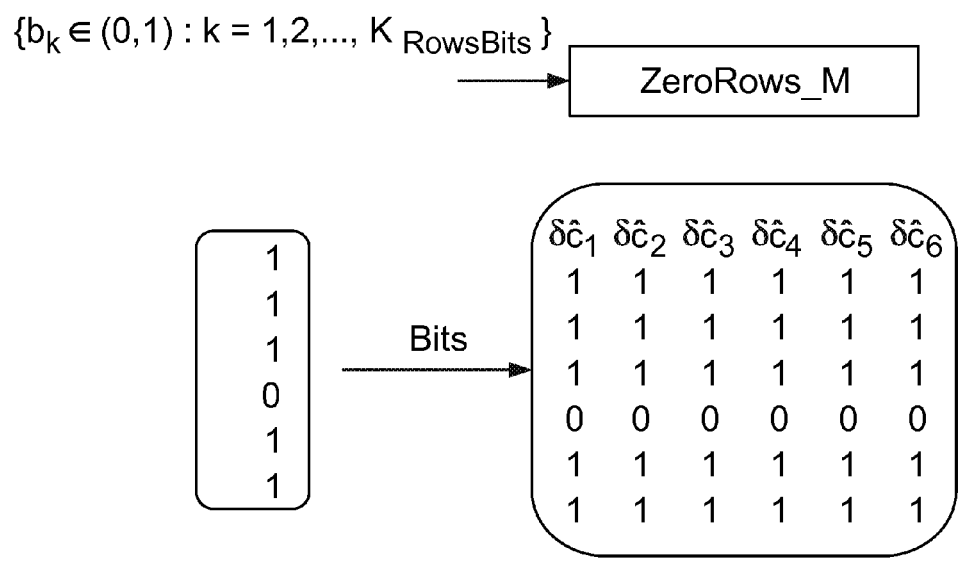
FIG. 35 is an illustration of zero rows construction.
Figure 36:
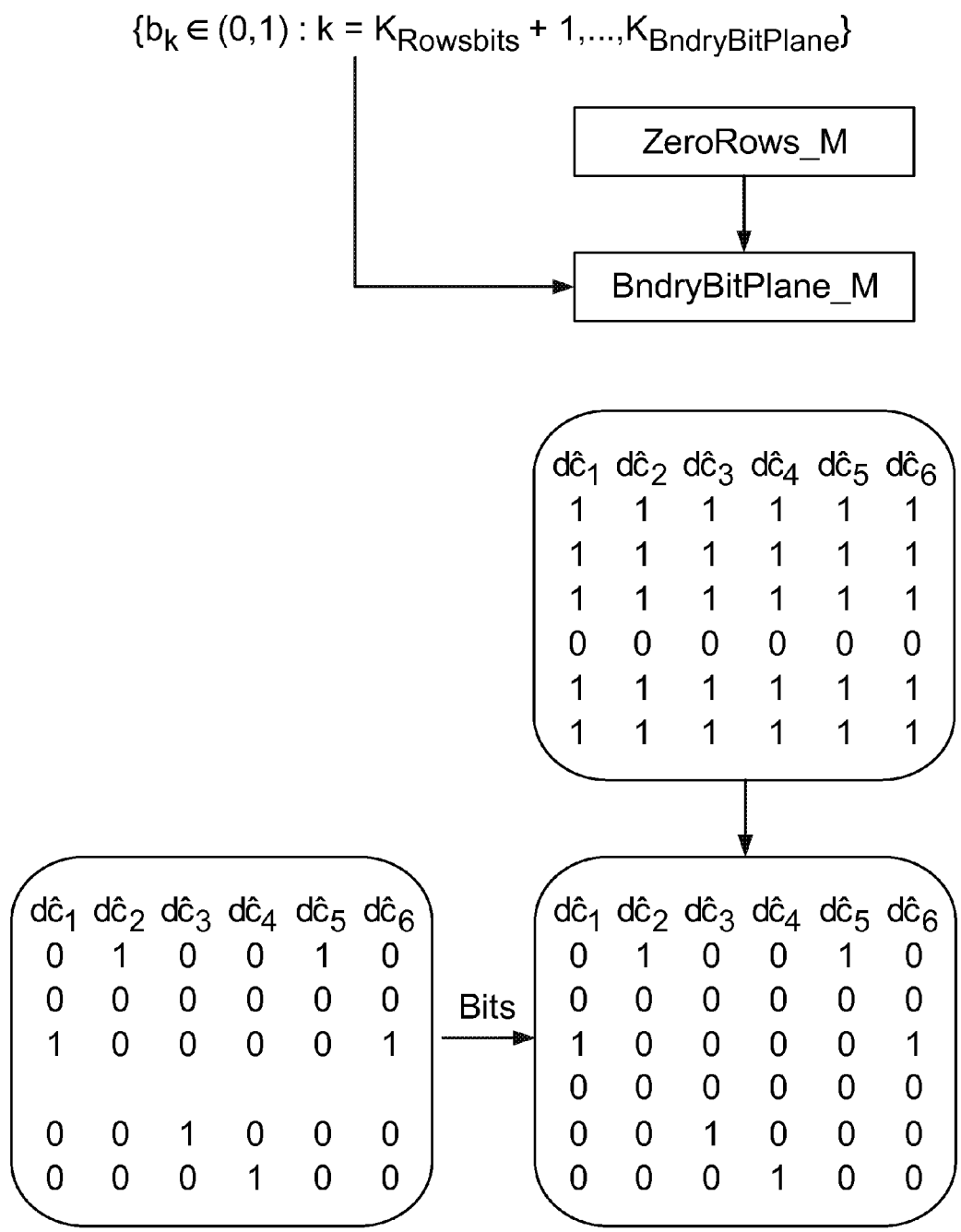
FIG. 36 is an illustration of boundary bit plane construction.
Figure 37:
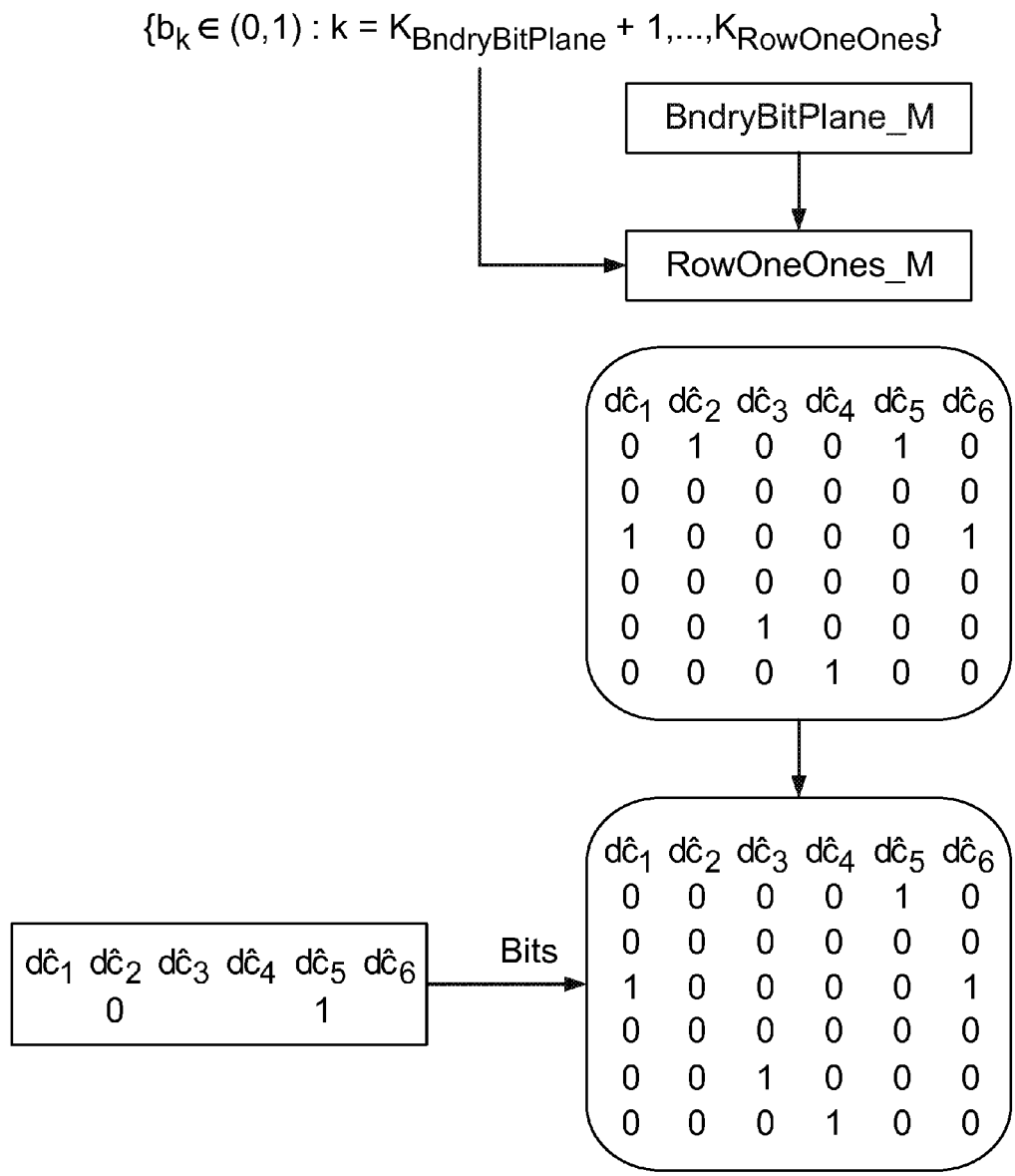
FIG. 37 is an illustration of row ones construction.
Figure 38:
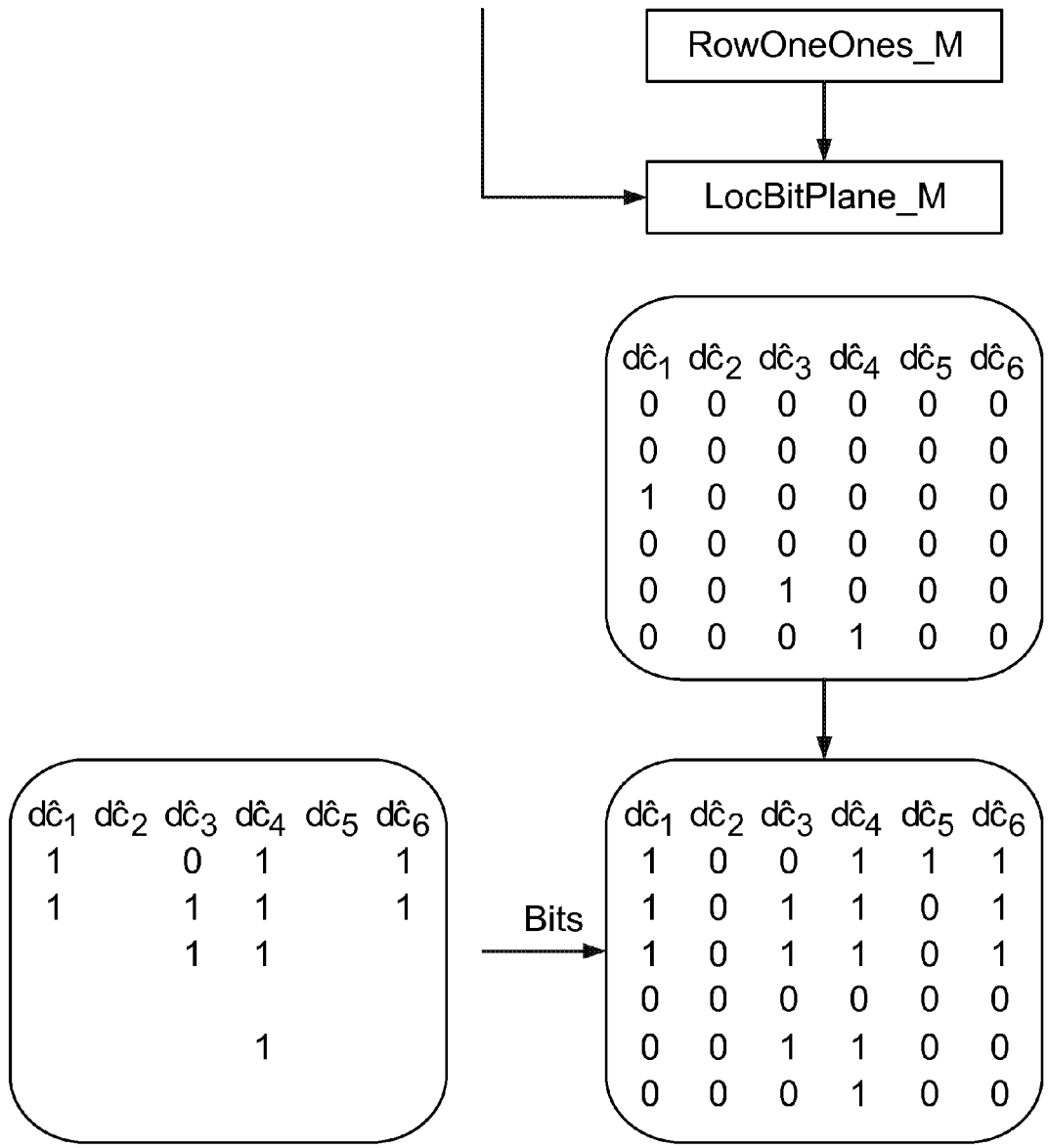
FIG. 38 is an illustration of bit plane construction.

Referring now to FIG. 34, the lossless PT decoder is shown which receives as input the output of the lossless PT encoder (note it is assumed here that a lossless decoder such as an Arithmetic decoder was appropriately used to derive this input). The front part of the decoder constructs an $n \times N_B$ matrix, ZeroRows_M, made up of either unity rows or zero rows depending on the nature of the ZeroRows bits. In FIG. 35 this construction is illustrated with the running illustrative example. Note that the ZeroRows bits that were derived in FIG. 31 are now used to construct a 6×6 matrix consisting of either unity or zero rows. Next the ZeroRows_M matrix is used in conjunction with the BndryBitPlane bits to generate the $n \times N_B$ matrix BndryBitPlane_M. This process is illustrated in FIG. 36. The next step is to use the derived BndryBitPlane_M matrix together with the RowOneOnes bits to derive a RowOneOnes_M matrix that is also of dimension $n \times N_B$. This process is illustrated in FIG. 37. Next the RowOneOnes_M matrix is combined with the LocBitPlane bits to derived a LocBitPlane_M matrix of dimension $n \times N_B$. In FIG. 38 this combination is shown for the illustrative example where it is noted that the Loc_Bit_Plane_M matrix is identical to the NZ_Amplitude_Locations matrix shown in FIG. 29. This rather straightforward reconstruction procedure is appropriately continued until the desired error sequence $\{\delta \hat{c}_k:$ $k=1, \ldots, N_B\}$ is fully derived. In the next section the proposed algorithm is applied to SAR imagery.

A Real-World Application

The efficacy of the previously advanced bit planes PT method is now demonstrated by comparing it with wavelets based JPEG2000 in a real-world application. The application consists of compressing 4 MB SAR imagery by a factor of 8,192 and then using the decompressed imagery as the input to the covariance processor coder of a KA-AMTI radar system subjected to severely taxing environmental disturbances. This SAR imagery is prior knowledge used in KA-AMTI radar to achieve outstanding SINR radar performance.

Figure 7:
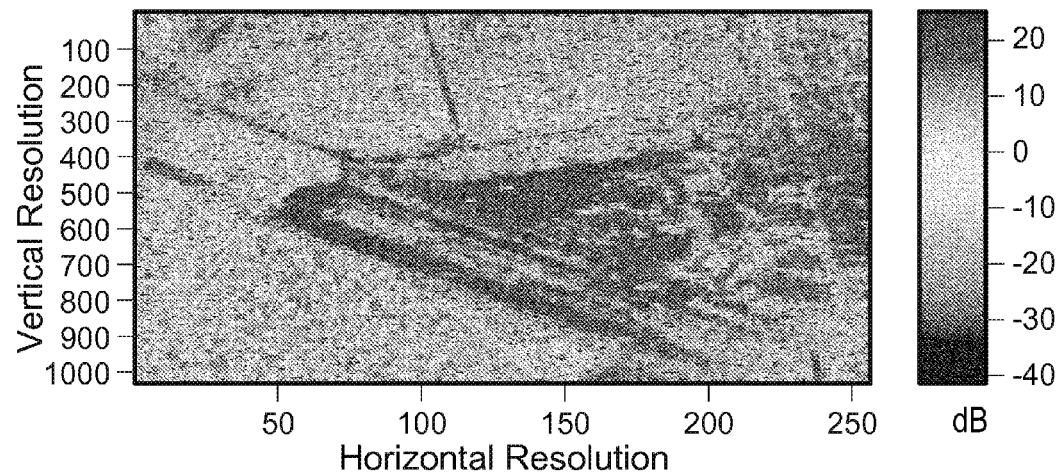
FIG. 7 is a SAR image of the Mojave Airport, California.
Figure 39:
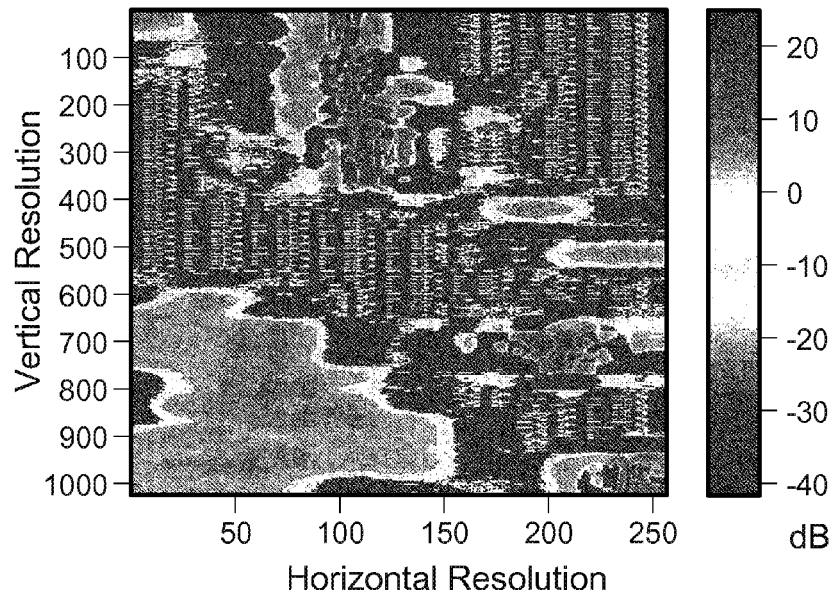
FIG. 39 is an illustration of a 512 byte JPEG2000 decompressed SAR image.

The 4 MB SAR image that will be tested is given in FIG. 7. The magnitude of the image is in dBs and consists of 1024 rows and 256 columns, and represents an image of the Mojave Airport in California. This image was compressed using a 16×1 strip processor that moves on the image from left to right and top to bottom. In FIG. 17 the decompressed SAR image is shown that was derived when the image was compressed by a factor of 8,192 using the PT source coder of this paper. The SNR performance described by $$SNR = 10\log_{10}\left[\sum_i \sum_j y_{ij}^2 \Big/ \sum_i \sum_j (y_{ij} - \hat{y}_{ij})^2\right] \quad (4.10)$$

derived with this approach is equal to 12.5 dBs. In FIG. 39 the corresponding decompressed image for JPEG2000 is shown. The SNR performance for this case yields a value of 7.0 dB, which is more than 5 dB away from the PT approach. In addition, the SINR radar performance derived with JPEG2000 is worse by 2 dB than that for the same PT source coding technique.

In another aspect, the present invention relates to a simplified approach for determining the output of a total covariance signal processor. Such an approach may be used, for example, in connection with an antenna-based radar system to make a decision as to whether or not a target may be present at a particular location. Instead of estimating the output of a clutter covariance processor by performing certain calculations offline, characterizing the input signal using online calculations, and then using the online calculations to select one of the offline calculations, as discussed in the embodiments above dealing with clutter covariance processors, in this embodiment, a single offline set of calculations is performed and then used to estimate of the output of the total covariance processor in conjunction with the antenna signal obtained at the time of viewing a target.

In the case of an antenna-based radar application, the antenna pattern is shifted to a Shifted Antenna Pattern (SAP) and the single set of offline calculations are performed with this SAP in mind. The Shifted Antenna Pattern is determined based on some determination of the clutter centroid signal for the various range bins of the antenna image. For example, the Shifted Antenna Pattern may be determined based on the standard deviation of the clutter centroid signal, or an RMS estimation of the clutter centroid signal.

In the present embodiment of the invention, it is generally unnecessary to evaluate online the clutter centroid for each image range bin, since the offline calculations act to select the best global and symmetrically placed Shifted Antenna Pattern to use with all range bins to estimate the total covariance signal. Although a pair of Shifted Antenna Patterns may be used, with each pattern of the pair being symmetrically offset with respect to the initial antenna pattern, a single pattern of the Shifted Antenna Pattern pairs may be used, with generally very similar results. The reason as to why performance using a single pattern of the Shifted Antenna Pattern pair is generally close to that obtained using a pair of patterns, is generally due to the even/odd processing symmetries of the clutter steering vectors, as well as the symmetrical structure of the antenna pattern.

In this embodiment of the invention, the SAP main lobe peak is restricted to reside at only one of the five positions specified in Equation 3.11 above.

The output of the total covariance processor, or space time processor, is generally of the form:

$$y = x \cdot w \quad (5.1)$$

where x is based on the antenna signal, and w is a weighting vector determined online. In turn, w may be determined based on the following equations:

$$w = [{}^{RBCC}_{CCPC}R]^{-1}s \quad (5.2)$$

$$^{RBCC}_{CCPC}R = R \mid_{R_c^f = {}^{RBCC}_{CCPC}R_c^f} \quad (5.3)$$

$$^{RBCC}_{CCPC}R_c^f \in \{PCC(k, j)\} \mid_{S^{RBCC}_{CCPC}} \quad (5.4)$$

$$S^{RBCC}_{CCPC} = \{{}_f^{RBCC}\sigma_{c,i}^2, \theta_{shift}, PCP_1 = 57 \text{ dBs}, PCP_2 = 75 \text{ dBs}\} \quad (5.5)$$

$$\theta_{shift} \in \{-14°, -7°, 0°, 7°, 14°\} \quad (5.6)$$

The SAP mainlobe peak position $\theta_{shift}$ was tested for the five cases in Equation 5.6 and the compressed/decompressed clutter source power ${}_f^{RBCC}\sigma_{c,i}^2$ was derived using a PT radar blind scheme. When these five processor coders were simulated with the radar blind clutter compressor or RBCC, the best AASE was produced when the SAP was shifted to either 14° or −14°. More specifically, the AASE values for these two cases emulated the value of 1.27 dBs for CCPC Case III discussed above. These results suggest that the simulated test SAR image is characterized by a pair of SAPs symmetrically placed with respect to the moving target or initial antenna position, and where only one of the Shifted Antenna Patterns is needed to yield satisfactory radar performance. An investigation of the clutter centroid information indicates that the direction to shift the antenna pattern to over all 64 range bins may be governed by some power of the standard deviation of the clutter centroid from the boresight position (CC=128.5). It is of interest to note that when the clutter is homogeneous, the clutter centroid will be equal to 128.5 for all 64 range bins and thus the selected SAP will point in the same direction as the actual unshifted antenna pattern as expected.

Figure 40:
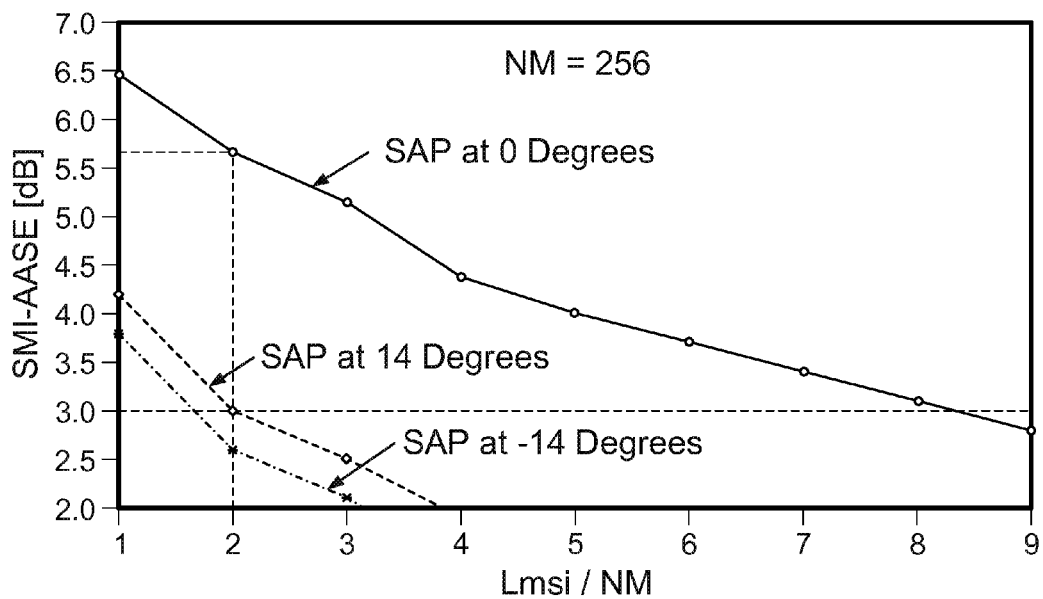
FIG. 40 is an illustration of SMI-AASE versus Lmsi/NM.

The offline determined best angle to shift the SAP to could be used to make the actual antenna pattern reflect this shifted position. A sample matrix inverse (SMI) technique can then be used with this SAP to yield a knowledge aided SMI scheme that can be viewed as an extreme case of memory space and computational time compressed KA-AMTI radar. Results for an application of such an approach are shown in FIG. 40.

The SINR expressions that were used to derive the SMI-AASE results are as follows:

$$SINR(\theta_{shift}) = \frac{w(\theta_{shift})^t ss^t w(\theta_{shift})}{w(\theta_{shift})^t R(\theta_{shift} = 0) w(\theta_{shift})} \quad (5.7)$$

$$w(\theta_{shift}) = [{}^{smi}R(\theta_{shift})]^{-1}s \quad (5.8)$$

$$^{smi}R(\theta_{shift}) = \frac{1}{Lsmi}\sum_{i=1}^{Lsmi} X_i(\theta_{shift})X_i^H(\theta_{shift}) + \sigma_{diag}^2 I \quad (5.9)$$

$$X_i(\theta_{shift}) = R_i^{-1/2}(\theta_{shift})x_i \quad (5.10)$$

$$R_i(\theta_{shift}) = R_i \mid_{G_A^f(\theta_c^L, \theta_t = 0) \Rightarrow G_A^f(\theta_c^L - \theta_{shift}, \theta_t = 0)} \quad (5.11)$$

$$\theta_{shift} \in \{-14°, 0°, 14°\} \quad (5.12)$$

where: a) $X_i(.)$ denotes a radar measurement from a range bin close to the range bin under investigation; b) $L_{smi}$ is the number of measurement samples; c) $\sigma_{diag}^2 I$ is a diagonal loading term where $\sigma_{diag}^2 = 10$; d) $x_i$ is a zero mean, unity variance, NM dimensional complex random draw; e) $R_i$ is the total disturbance covariance associated with the $i^{th}$ range bin; and f) $\theta_{shift}$ is the angle from boresight to where the peak of the antenna pattern has been shifted.

In the case of the example of FIG. 40, it is noted that when the SAP is shifted to either +14 or −14 degrees from boresight, a significantly better average of average SINR error (AASE) is derived confirming the predicted result that was inferred from the robustness study of the CCPC Case III. Of the three SAPs simulated, the best result is derived when the SAP is shifted to −14° from boresight. For instance, note how for Lsmi=512 the derived AASE value of 2.6 dBs is at least 3 dBs better than the 5.7 dBs that is derived with the non knowledge aided SMI case when $\theta_{shift}=0$ degrees.

Thus, the offline calculations may be performed for a single shifted antenna pattern, and this single set of offline calculations used in conjunction with the antenna signal obtained online to determine the estimated output of the clutter covariance processor.

In yet another embodiment of the present invention, a simplified algorithm for performing matrix inversion is used, for example, in conjunction with the previously described embodiment where the output of the total covariance processor is estimated using an inverse matrix, such as the inverse matrix $R^{-1}$ discussed above.

The simplified matrix inversion algorithm utilizes a sidelobe canceller approach for matrix inversion, in conjunction with the predictive transform estimation approaches discussed herein. The sidelobe canceller essentially removes and/or minimizes the effect of the antenna sidelobe signals on the antenna main beam return signal, x. Background information relating to sidelobe cancellers may be found in J. R. Guerci, *Space-Time Adaptive Processing for Radar* (Artech House, 2003), the contents of which are incorporated herein by reference. The general approach for the simplified matrix inversion algorithm is in accordance with Equation 5.2, which may be rewritten as:

$$w = (I - I + R^{-1})s \quad (6.1)$$

$$wx = Isx - (I - R^{-1})sx \quad (6.2)$$

where the term Isx corresponds to the main beam signal, and the term $(I-R^{-1})sx$ corresponds to the sidelobe signal.

Figure 41:
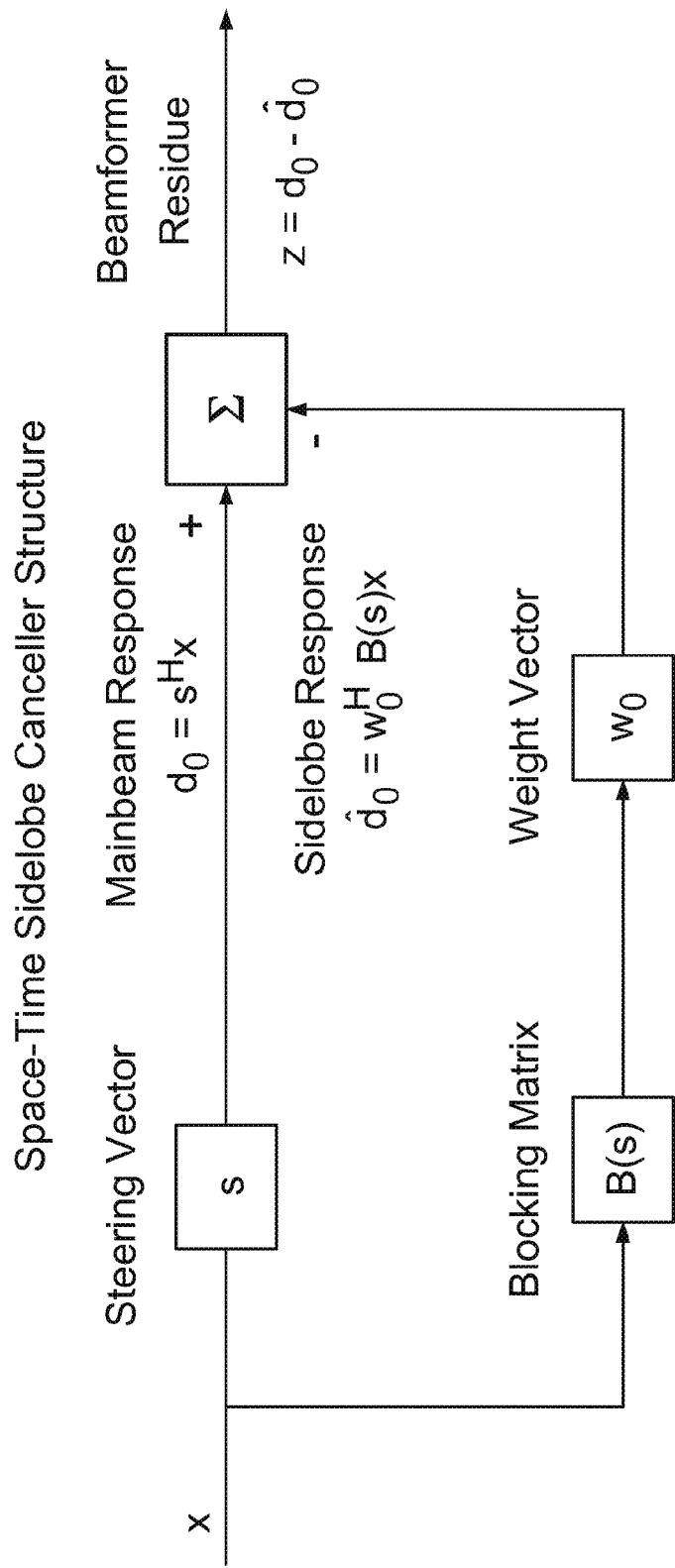
FIG. 41 is a block diagram of an embodiment of the space-time sidelobe canceller structure for an antenna-based radar application according to the present invention.

Referring now to FIG. 41, therein is illustrated a block diagram of an embodiment of the space-time sidelobe canceller structure for an antenna-based radar application according to the present invention. The input to the sidelobe canceller is the output of the antenna, i.e., complex vector x of dimension NM. This antenna output is multiplied by the NM dimensional complex steering vector s of the assumed moving target to yield the "mainbeam" scalar complex response $d_0 = s^H x$. The antenna output x is also multiplied by a blocking (or null) matrix B(s) of dimension K×NM. The output of the blocking matrix is in turn multiplied by the K dimensional weighting column vector $w_0$ given by the following expression $$w_0 = [B(s) R B^H(s)]^{-1} B(s) R s \quad (6.3)$$

where R is the total covariance matrix. In turn, this multiplication yields the scalar complex sidelobe response $$\hat{d}_0 = s^H R B^H(s) [B(s) R B^H(s)]^{-1} B(s) x \quad (6.4)$$

which is then subtracted from $d_0$ to yield a scalar and complex beamformer residue $z = d_0 - \hat{d}_0$ whose value is then used to determine if a target is present. The blocking matrix B(s) has K rows that are "approximately" orthogonal to s and given by the following expression $$B(s) = [0_{K \times 1} I_K 0_{K \times (NM-K-1)}][\text{Diag}(s) T_{PT}]^H \quad (6.5)$$

where $0_{K \times 1}$ is a K dimensional column vector, $I_K$ is a K dimensional identity matrix, and $0_{K \times 1}$ is a K×(NM−K−1) dimensional zero matrix. Diag(s) is an NM dimensional diagonal matrix whose diagonal elements are the NM elements of s and $T_{PT}$ is a NM×NM predictive-transform (PT) matrix appropriately designed making use of the PT design equation and isotropic statistics set forth below.

PT Design Equation $$\left\{ E[x_k x_k^t] - [E[x_k x_{k-1}^t] E[x_k]] \begin{bmatrix} E[x_k x_{k-1}^t] & E[x_{k-1}] \\ E[x_{k-1}^t] & 0 \end{bmatrix}^{-1} \begin{bmatrix} E x_{k-1} x_k^t \\ E[x_k^t] \end{bmatrix} \right\} T_{PT} = T_{PT} \Lambda \quad (6.6)$$

Isotropic Statistics

The first and the joint second order statistics of $x_k$ and $x_{k-1}$, i.e., $E[x_k]$, $E[x_{k-1}]$, $E[x_k x_k^t]$, $E[x_{k-1} x_{k-1}^t]$, $E[x_k x_{k-1}^t]$ and $E[x_{k-1} x_k^t]$ used in the above PT design equation are assumed to be stationary where $x_k$ and $x_{k-1}$, are real NM dimensional vector versions of the antenna NM dimensional input x at two different times. To find these stationary statistics the following isotropic model is used for the samples of $x_k = [x_{11}, \ldots, x_{1N}, x_{12}, \ldots, x_{N2}, \ldots, x_{1M}, \ldots, x_{NM}]$:

$$E[x_{ij}] = K \quad (6.7)$$

$$E[(x_{ij} - K)(x_{i+v, j+h} - K)] = (P_{avg} - K^2) \rho^D \quad (6.8)$$

$$\rho = E[(x_{ij} - K)(x_{i,j+1} - K)] / (P_{avg} - K^2) \quad (6.9)$$

$$D = \sqrt{v^2 + h^2} \quad (6.10)$$

where v and h are integers, ρ is the average correlation coefficient between any two adjacent samples, K is the average value of any sample, and $P_{avg}$ is the average power associated with each sample.

The first bracketed term in Equation 6.5 essentially functions to select the K-most energetic columns in the NM×NM covariance matrix, thereby resulting in a K×K matrix, which is then subject to the matrix inversion process. Thus, instead of performing a matrix inversion on a relatively large size NM×NM matrix, the matrix inversion is carried out on a relatively smaller K×K size matrix. As noted from Equation 6.5, the PT sidelobe canceller is signal dependent. However, its evaluation can be readily accelerated using parallelism. When simulated with an exemplary test SAR image, it was found that K=31 yields outstanding SINR radar performance.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

What is claimed:

1. A method for determining the output of a total covariance signal processor based on a received input signal, comprising the following steps:
    determining a shifted pattern based on statistical information relating to the input signal;
    shifting an input signal modifier based on the shifted pattern;
    receiving the input signal; and
    combining the received input signal in accordance with the shifted pattern to thereby estimate the output of the total covariance signal processor.

2. A method for determining the output of a total covariance signal processor based on a received input antenna signal, comprising the following steps:
    determining a shifted antenna pattern based on statistical information relating to range bins of the antenna signal;
    shifting a main lobe of the antenna pattern in accordance with the shifted antenna pattern;
    receiving the input antenna signal; and
    combining the received input antenna signal in accordance with the shifted antenna pattern to thereby estimate the output of the total covariance signal processor.

3. The method of claim 2, wherein the determining step is performed using a clutter centroid signal of the antenna signal.

4. The method of claim 2, wherein the determining step is performed using an RMS estimation of a clutter centroid signal of the antenna signal.

5. The method of claim 2, wherein the estimation of the total covariance signal processor output is based on the determination of an inverse covariance matrix.

6. The method of claim 5, wherein the determination of the inverse covariance matrix is performed using a sample matrix inversion process.

7. The method of claim 6, wherein the sample matrix inversion process comprises the step of performing side lobe cancellation.

8. The method of claim 7, wherein the sample matrix inversion process comprises the step of performing matrix inversion of a reduced dimension subset of the inverse covariance matrix.

9. The method of claim 7, wherein the step of performing side lobe cancellation comprises the following steps:
    multiplying the antenna signal by a blocking matrix and a weighting vector to produce a side lobe response signal;
    multiplying the antenna signal by a steering vector to produce a main beam response signal;
    subtracting the side lobe response signal from the main beam response signal to produce a side lobe cancelled signal.

10. A programmed processor for determining the output of a total covariance signal processor based on a received input antenna signal, comprising:
- a programmed microprocessor;
- a program memory device containing instructions for causing the programmed microprocessor to perform the following steps:
- determining a shifted antenna pattern based on statistical information relating to range bins of the antenna signal;
- shifting a main lobe of the antenna pattern in accordance with the shifted antenna pattern;
- receiving the input antenna signal;
- combining the received input antenna signal in accordance with the shifted antenna pattern to thereby estimate the output of the total covariance signal processor based on the determination of an inverse covariance matrix.

11. The programmed processor of claim 10, wherein the program memory device contains additional instructions for causing the programmed microprocessor to perform the additional following steps:
- determining the inverse covariance matrix by performing a sample matrix inversion process using side lobe cancellation;
- wherein the step of performing side lobe cancellation comprises the following steps:
  - multiplying the antenna signal by a blocking matrix and a weighting vector to produce a side lobe response signal;
  - multiplying the antenna signal by a steering vector to produce a main beam response signal;
  - subtracting the side lobe response signal from the main beam response signal to produce a side lobe cancelled signal.

* * * * *